(12) United States Patent
Piesinger

(10) Patent No.: US 8,437,431 B1
(45) Date of Patent: May 7, 2013

(54) SEQUENTIAL DECODER FAST INCORRECT PATH ELIMINATION METHOD AND APPARATUS FOR PSEUDO-ORTHOGONAL CODING

(76) Inventor: Gregory Hubert Piesinger, Cave Creek, AZ (US)

( * ) Notice: Subject to any disclaimer, the term of this patent is extended or adjusted under 35 U.S.C. 154(b) by 1178 days.

(21) Appl. No.: 12/283,211

(22) Filed: Sep. 10, 2008

Related U.S. Application Data

(60) Provisional application No. 60/994,533, filed on Sep. 20, 2007.

(51) Int. Cl.
*H04L 27/14* (2006.01)

(52) U.S. Cl.
USPC .............................. 375/324; 375/262; 375/340

(58) Field of Classification Search .................. 375/324, 375/265, 232, 296
See application file for complete search history.

(56) References Cited

U.S. PATENT DOCUMENTS

| | | | | |
|---|---|---|---|---|
| 5,335,250 A | * | 8/1994 | Dent et al. ..................... | 375/224 |
| 5,831,977 A | * | 11/1998 | Dent ............................... | 370/335 |
| 5,838,728 A | * | 11/1998 | Alamouti et al. ............. | 375/265 |
| 6,233,274 B1 | * | 5/2001 | Tsui et al. ...................... | 375/227 |
| 6,507,628 B1 | * | 1/2003 | McCallister et al. ......... | 375/341 |
| 6,728,322 B1 | * | 4/2004 | Asai et al. ...................... | 375/340 |
| 7,239,668 B2 | * | 7/2007 | De Gaudenzi et al. ....... | 375/279 |
| 7,733,945 B2 | * | 6/2010 | Myers et al. ................... | 375/149 |
| 2004/0081074 A1 | * | 4/2004 | Piechocki ...................... | 370/206 |

* cited by examiner

*Primary Examiner* — Daniel Washburn
*Assistant Examiner* — Qutbuddin Ghulamali
(74) *Attorney, Agent, or Firm* — Schmeiser, Olsen & Watts LLP; Lowell W. Gresham

(57) ABSTRACT

A communication system includes a transmitter which generates transmit phase points defined to be the vector sum of two or more QPSK signals. Forward error correction encoding is performed independently for the QPSK signals. In a receiver, alternate hypotheses are formed about the potential values that might have been transmitted for all the QPSK signals, and offset phase points are defined for each hypothesis. For the correct hypothesis, the offset phase point has the effect of canceling all the two or more QPSK signals from the combined communication signal leaving only circuit and channel noise added during transmission. Branch metrics are responsive to Euclidean distances between the received signal and the hypothesized transmitted signal. A decoder is configured to accept and reject the hypotheses based on the noise statistics and desired communication application symbol error rate.

19 Claims, 12 Drawing Sheets

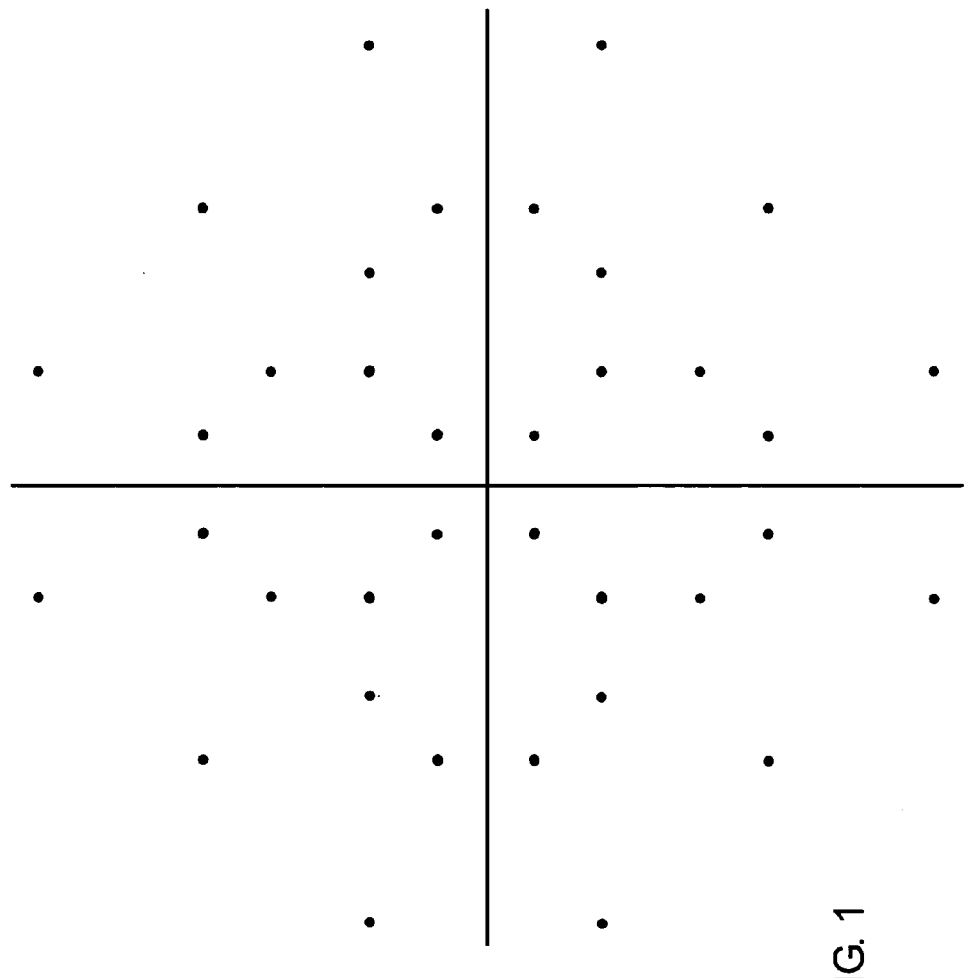
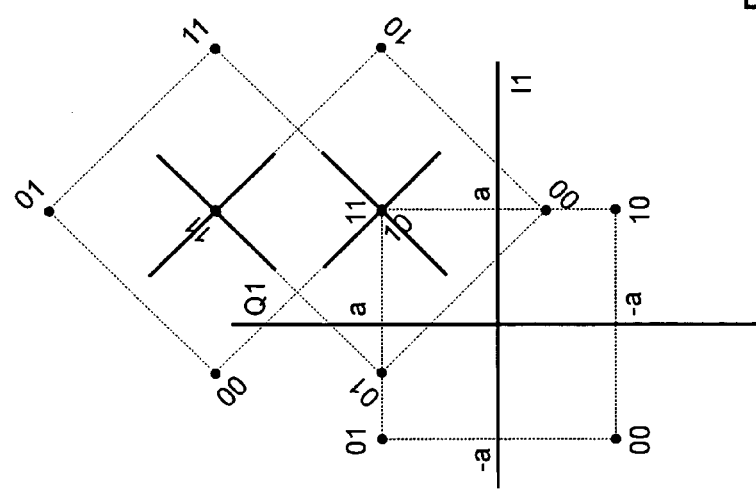
FIG. 1

SEQUENTIAL DECODER FAST INCORRECT PATH ELIMINATION METHOD AND APPARATUS FOR PSEUDO-ORTHOGONAL CODING

RELATED INVENTION

The present invention claims benefit under 35 U.S.C. 119 (e) to "Pseudo-Orthogonal Coding Method Enhancements," U.S. Provisional Patent Application Ser. No. 60/994,533, filed 20 Sep. 2007, which is incorporated by reference herein.

TECHNICAL FIELD OF THE INVENTION

The present invention relates to the field of forward error correction coding (FEC). More specifically, the present invention relates to a coding method that provides greater coding gain than current coding methods.

BACKGROUND OF THE INVENTION

The goal of a modern digital communication system design is to send the maximum amount of information possible across a band limited channel using the least amount of power.

The attached Appendix "Communication Method and Apparatus" contains background material on a new coding method that pseudo-orthogonal combines multiple QPSK signals to produce a higher order quadrature amplitude modulation (QAM) constellation.

The present invention describes methods and apparatus that retains the correct path through a sequential decoder while efficiently eliminating incorrect paths.

SUMMARY OF THE INVENTION

The Appendix describes an invention that makes multiple hypothesis as to which QPSK signal was transmitted for each of the QPSK constellations that were combined with a base QPSK constellation. The signals from these additional QPSK constellations are cancelled from the received signal, thus leaving only the base QPSK constellation.

The present invention makes multiple hypothesis as to which QPSK signal was transmitted for all the combined QPSK constellations. The signals from all QPSK constellations are cancelled from the received signal, thus leaving only the channel and circuit noise that was added during transmission when the correct transmit signal is hypothesized. That is, the residual to the received symbol is simply equal to the received noise. This residual will be statistically smaller than the residual for all other incorrect hypothesis.

The minimum path metric through the decoder will always indicate the correct decoding path if the correct path is retained for a sufficient period of time without being inadvertently eliminated. The present invention will show that the correct path will not be eliminated if adequate hardware and processing resources are provided to retain all paths that could potentially be the correct path.

The present invention will also show that the noise statistics determines these hardware requirements necessary to ensure that the correct path is not eliminated. The present invention will also describe preferred methods and apparatus that provide fast incorrect path elimination.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a 64-QAM embodiment of a phase point constellation built from three pseudo-orthogonal QPSK signals;

DETAILED DESCRIPTION OF THE PREFERRED EMBODIMENTS

The preferred embodiment will be illustrated for 64-QAM in which 3 QPSK modulations are combined in an additive white Gaussian noise (AWGN) environment. Each QPSK modulation uses the same rate 1/2 convolutional code with constraint length (K) equal to 11. The $2^{nd}$ and $3^{rd}$ QPSK constellations are rotated by plus and minus 45 degrees to form 36 constellation points as illustrated in FIG. 1 (and described in the Appendix for Appendix FIG. 21).

In the decoder, each existing branch forms 8 new branches for each new symbol received. The decoder calculates the path residual for each path and forms a path metric equal to the sum of all the residuals along that path as described in the Appendix.

The entire goal of the decoder is to not eliminate the correct path while eliminating incorrect paths as rapidly as possible.

Figure 2:
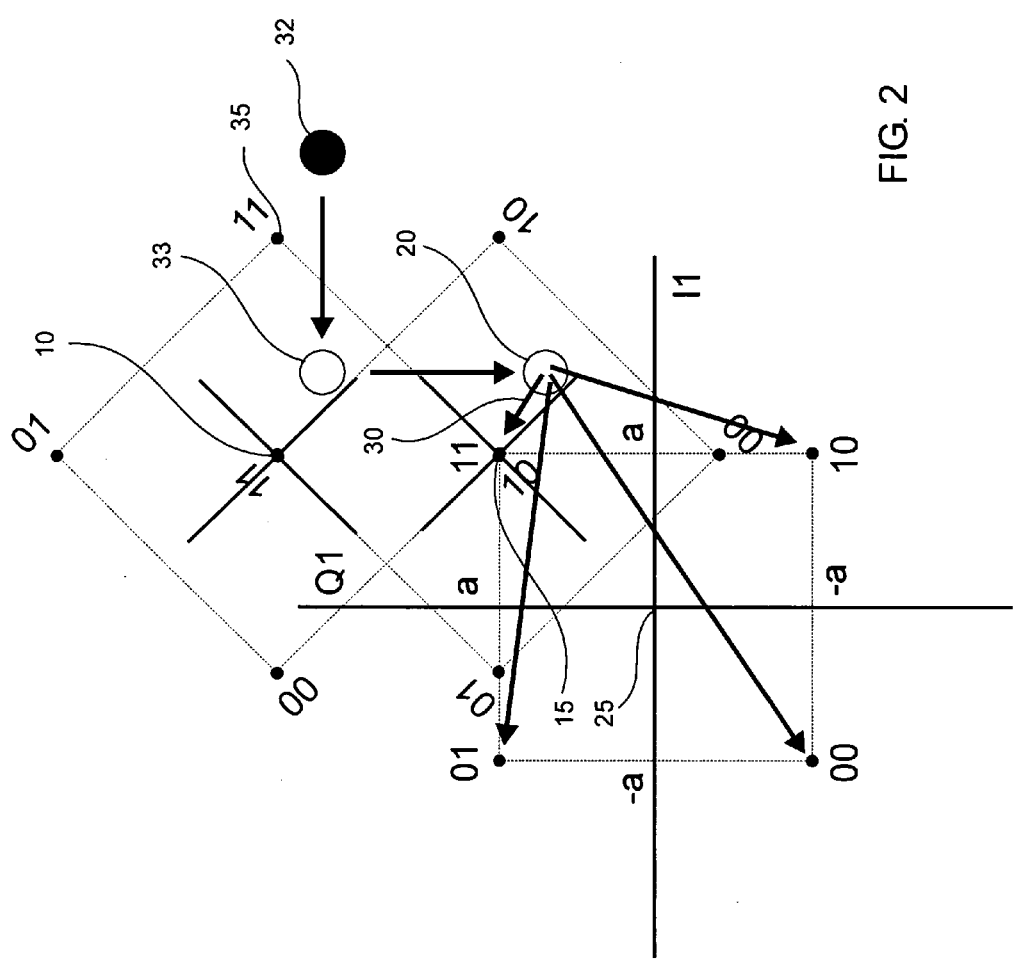
FIG. 2 graphically illustrates the cancellation of a third and second QPSK signal from a signal defined by a 64-QAM phase point constellation resulting from the vector addition of the second and third QPSK signals to a first QPSK signal.

Refer to FIG. 2 where the current received 64-QAM symbol 32 is obtained by combining a binary "11" symbol from each of the 3 combined QPSK constellations. The signal due to the $3^{rd}$ QPSK constellation 10 is canceled by moving the received 64-QAM symbol 32 leftward to position 33. The signal due to the $2^{nd}$ QPSK constellation 15 is canceled by moving the new altered received 64-QAM symbol at position 33 downward to position 20. The residuals from the new altered received symbol at position 20 are then calculated by finding the geometric distance to each symbol of the base QPSK constellation 25. The residual 30 to the binary "11" symbol of the base QPSK constellation 25 represents the channel and circuit noise that was added to the transmitted 64-QAM symbol. This cancellation procedure is fully explained in the Appendix where 2 QPSK constellations are combined (see Appendix FIG. 10).

Figure 3:
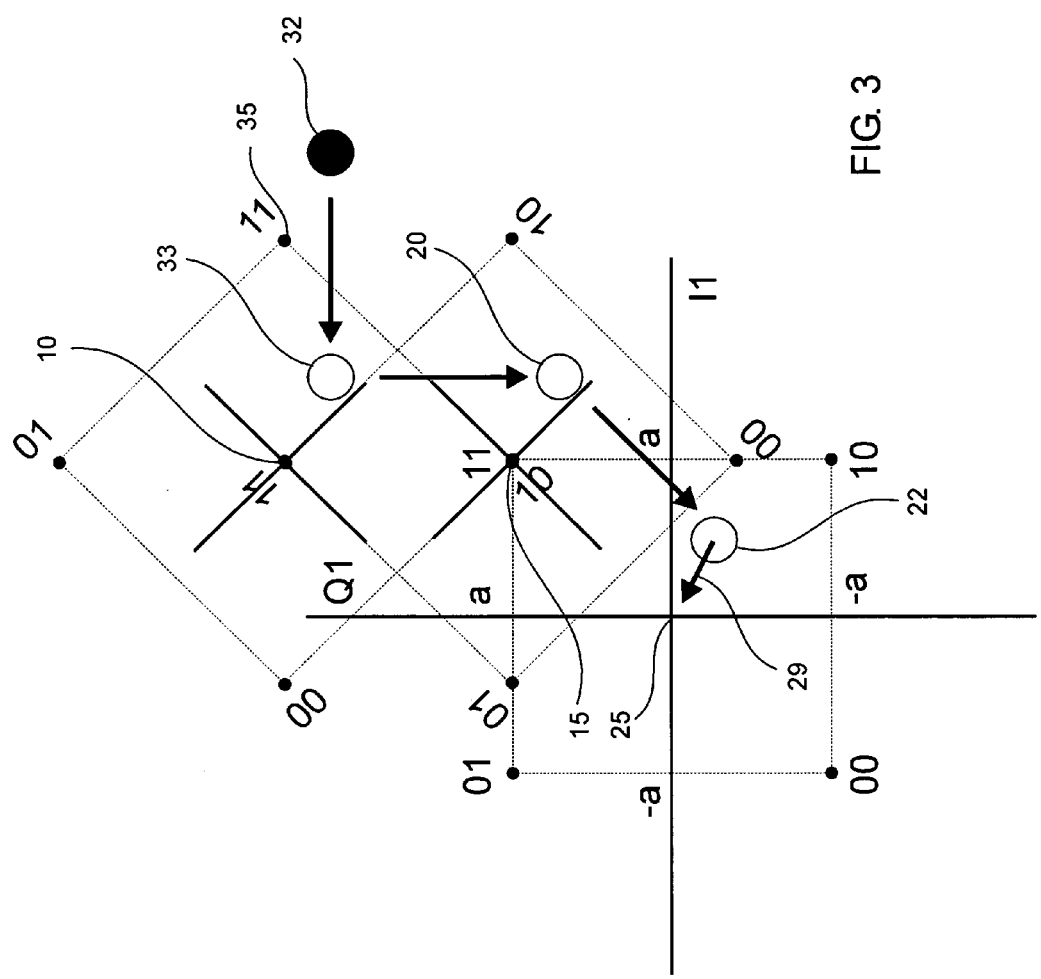
FIG. 3 graphically illustrates the cancellation of a third, second, and first QPSK signal from a signal defined by a 64-QAM phase point constellation resulting from the vector addition of the second and third QPSK signals to a first QPSK signal.

In this invention, the residual is calculated by postulating a third hypothesis as to which base QPSK symbol was transmitted, in addition to the first 2 hypothesis as illustrated in FIG. 3. That is, the signal due to the base QPSK constellation 25 is canceled by moving the new altered received 64-QAM symbol at position 20 down and to the left to position 22. The residual 29 from the new altered received symbol at position 22 is then calculated by finding the geometric distance to the origin of base QPSK constellation 25.

For the correct hypothesis, canceling all 3 QPSK signals from the received 64-QAM symbol 32 leaves only the channel and circuit noise residual 29. Note that the noise residual 29 in FIG. 3 is identical to the noise residual 30 in FIG. 2.

Figure 4:
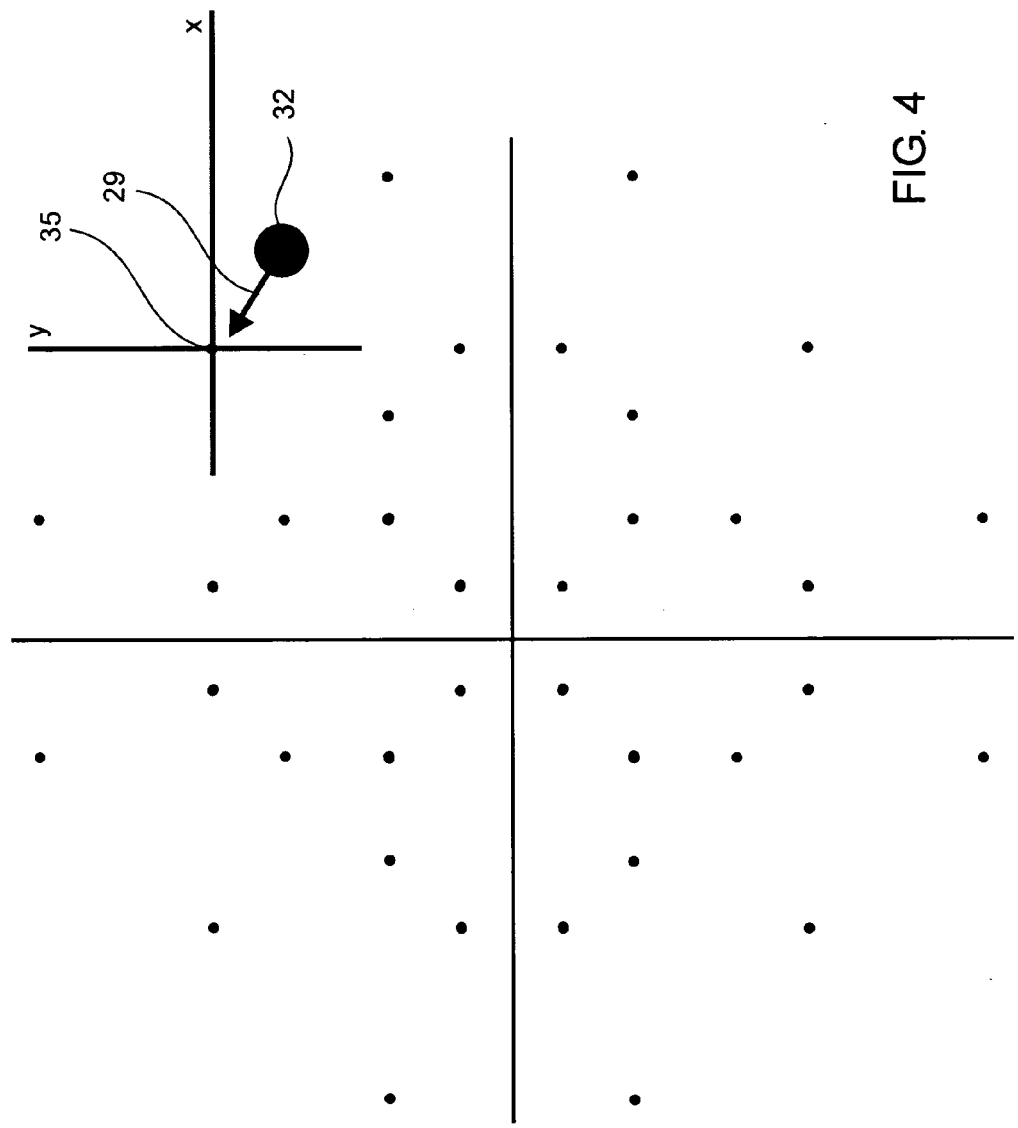
FIG. 4 graphically illustrates an equivalent method of the cancellation process in FIG. 3 by placing the origin of a coordinate system at the position of the hypothesized transmit symbol.

Calculating the residual by canceling all 3 QPSK signals from the received 64-QAM symbol 32 is equivalent to centering the origin of a x,y axis over the hypothesized transmit symbol 35 and calculating the geometric distance 29 from the origin to the received 64-QAM symbol 32 as illustrated in FIG. 4.

Since each received 64-QAM symbol 32 spawns 8 new branches in this 64-QAM example, fast path elimination is essential to reduce decoder complexity. Without fast path elimination, paths would grow at the rate of $8^n$ after receiving n 64-QAM symbols (2 million after only 7 received symbols).

For AWGN, the in-phase noise and quadrature-phase noise both have a Gaussian or normal probability distribution function (PDF) as is well known by those skilled in the art of communication systems. Therefore, the noise residual 29 of the received 64-QAM symbol 32 for a correctly hypothesized 64-QAM transmit symbol 35 is equal to that of a 2-dimensional Gaussian PDF centered on the hypothesized transmit symbol 35. As is well known to those skilled in the art, the geometric distance 29 from the received 64-QAM symbol 32 to the hypothesized transmit symbol 35 has a Rayleigh PDF. That is, the residual is Rayleigh distributed with a cumulative distribution function (CDF) as illustrated as the rightmost curve 50 in FIG. 5 where one standard deviation (sigma) is plotted to occur at x=100. As is well known to those skilled in the art, the CDF in FIG. 5 indicates the probability (vertical axis) that the value x of the residual (horizontal axis) is less than or equal to x.

To determine if a new branch should be spawned, the desired decoder symbol error rate (SER) is select. That is, the symbol error rate that can be tolerated by the coding application is selected. The new branch is spawned only if the residual 29 is less than the selected SER on the rightmost CDF curve 50.

For example, if the design SER is $10^{-8}$, then any residual 29 whose value is greater than 6.1 sigma (point 70) cannot be the correct path. Therefore, the new branch need not be spawned. That is any path, including the correct path, is allowed to be lost whenever its noise residual 29 occurs with a probability of less than $10^{-8}$.

Figure 5:
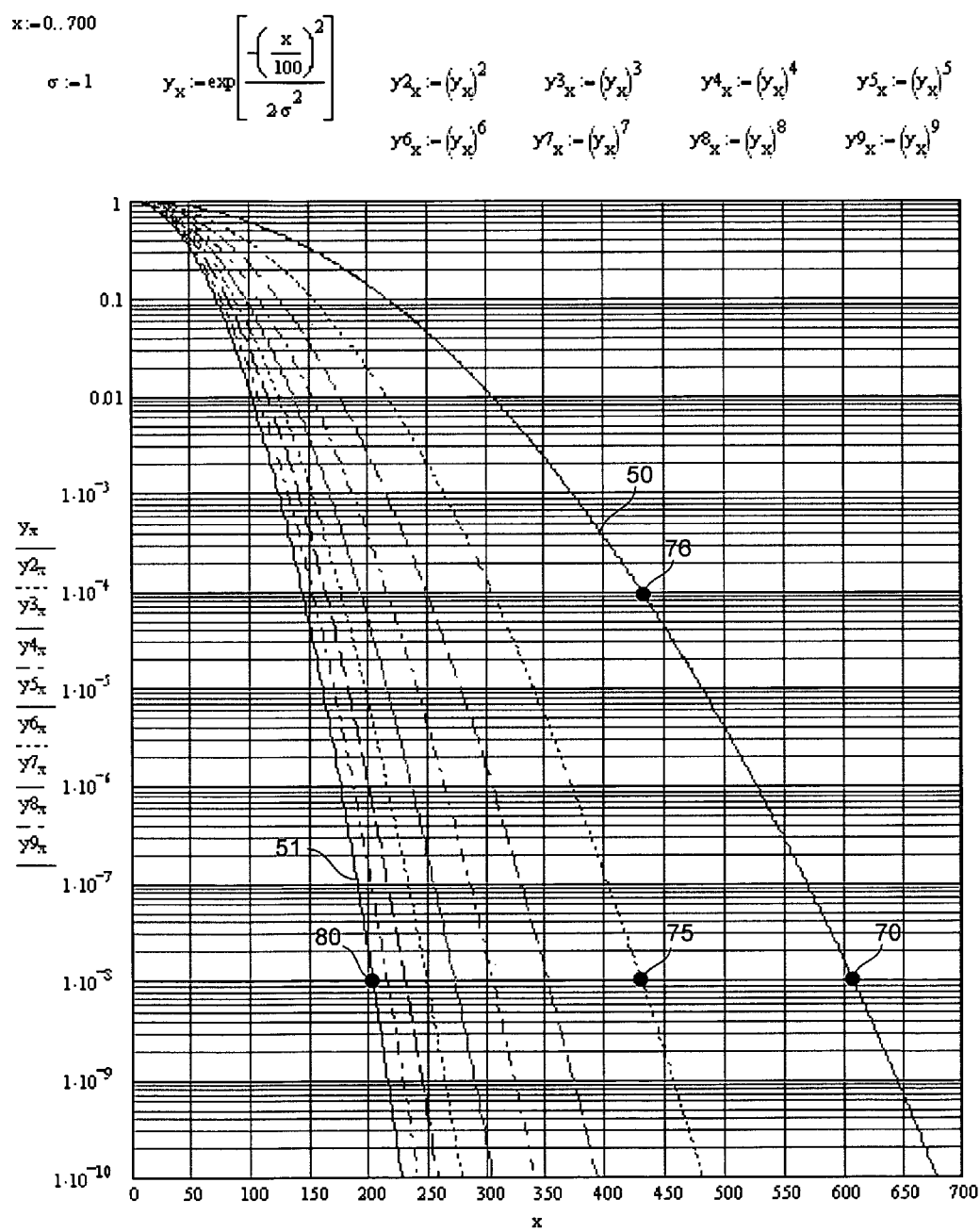
FIG. 5 shows a Rayleigh cumulative probability distribution function for noise residuals in an additive white Gaussian noise environment along with probabilities for various sequential noise residuals.

The 8 leftmost curves in FIG. 5 illustrate the maximum sequential (2 through 9) residuals that can be obtained on the correct path. As is well known by those skilled in the art, the probability P of obtaining 2 heads in a row on a coin flip is equal to p1 times p2 where p1 is the probability of getting a head on the first flip (0.5) and p2 is the probability of getting a head on the second flip (0.5). The probability P of getting 2 heads in a row is therefore equal to 0.25. Point 75 in FIG. 5 illustrates that two correct path residuals in a row cannot both exceed 4.3 sigma at a SER of $10^{-8}$ because p1 and p2 of each residual is $10^{-4}$ (point 76 on curve 50). For 9 sequential residuals, all cannot exceed 2.05 sigma (point 80 on curve 51).

Thus, one technique of determining if a new branch should be spawned is to determine if multiple sequential residuals exceed a threshold based on the design SER.

Figure 6:
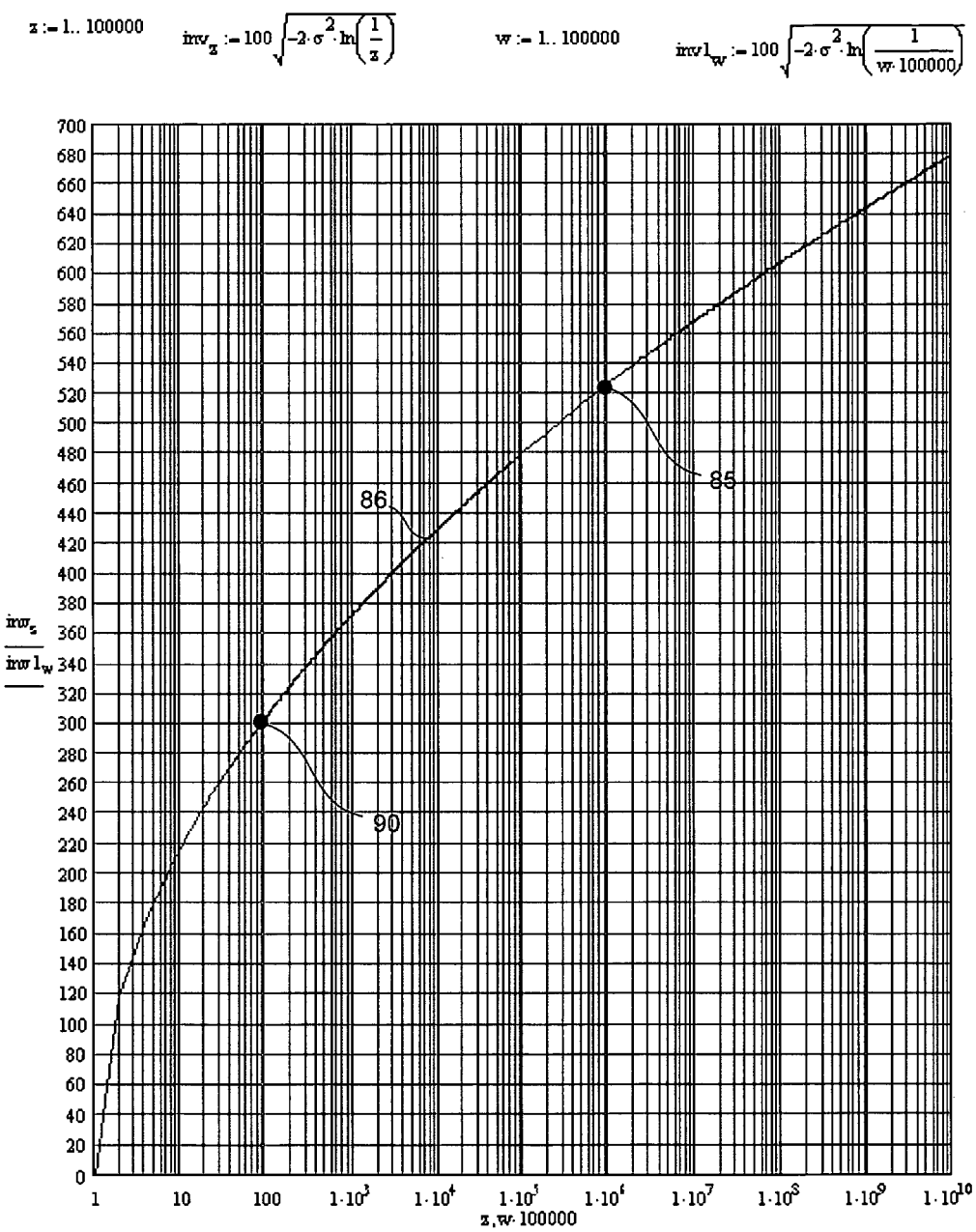
FIG. 6 shows the rightmost curve of FIG. 5 in another format in which the x and y axis are interchanged.

Alternatively, the Rayleigh CDF curve 50 can be redrawn as curve 86 illustrated in FIG. 6 where the design SER is plotted on the x axis (plotted as 1/SER so 100=$10^{-2}$) against the residual on the y axis. This CDF curve 86 indicates the maximum $2^{nd}$ residual value allowed based on the SER and $1^{st}$ residual value.

For example, if a $10^{-8}$ residual (point 85 equal to 525) is received for the $1^{st}$ residual value, than no greater than a $10^{-2}$ residual (point 90 equal to 300) can be received for the $2^{nd}$ residual because the probability of $10^{-6}$ for the $1^{st}$ residual value times $10^{-2}$ for the $2^{nd}$ residual value equals the design SER of $10^{-8}$. To get a $2^{nd}$ residual that is higher (less probable) would produce a combined 2-trial probability of less than $10^{-8}$ and thus could not be from the correct path.

Instead of multiplying probabilities, the probabilities can be converted to logarithms and summed as is well known to those skilled in the art. When the logrithmetic sum of these sequential residuals along a particular decoder code tree path exceed the logarithm of the design SER, the decoder code tree path can be terminated.

In summary, for each received symbol, the origin of the residual x,y axis is centered over the hypothesized transmit symbol and the residual from the received symbol to the origin calculated. If the probability of obtaining the residual, or the probability of obtaining a series of sequential residuals along a particular decoder path exceeds the SER, the decoder path is eliminated.

Figure 7:
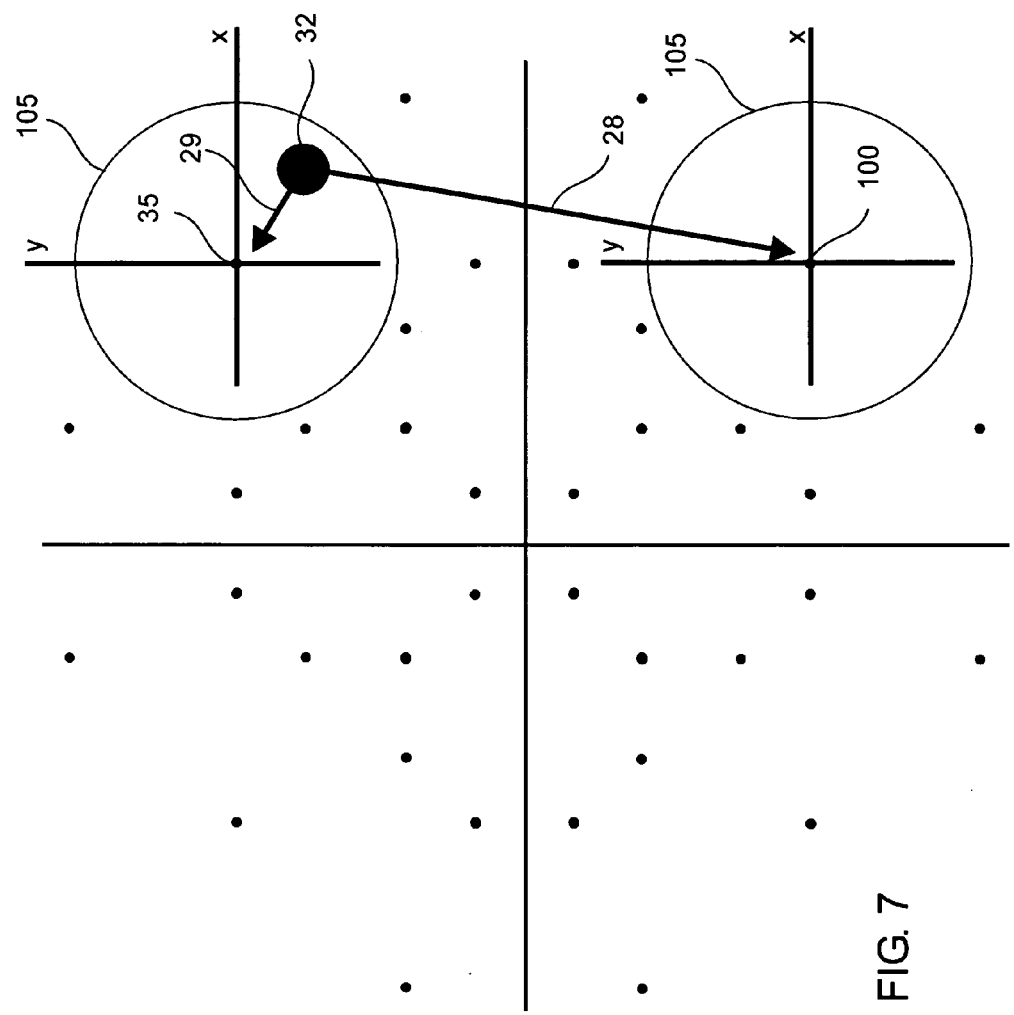
FIG. 7 shows the noise residual for a received 64-QAM symbol from 2 different hypothesized transmit symbols.

FIG. 7 illustrates 2 of the 8 possible path residuals in this 64-QAM example obtained for the received symbol 32 at 2 different hypothesized transmit symbol locations 35 and 100. Also illustrated is the circular maximum residual boundary 105 based on the design SER. Note that the hypothesized symbol 35 can be on the correct path because the residual 29 is inside the maximum residual boundary 105 while the hypothesized transmit symbol 100 in the lower right quadrant cannot be part of the correct path because the residual 28 is outside the maximum residual boundary 105 around hypothesized transmit symbol 100. Therefore, the branch associated with hypothesized transmit symbol 100 need not be spawned or the path can be eliminated if it exists.

Eliminating as many of the 8 new branches that potentially can be spawned for each received symbol is the most effective method of minimizing the number of paths in play. A branch not spawned cannot go on to spawn additional branches for subsequent received symbols.

Figure 8:
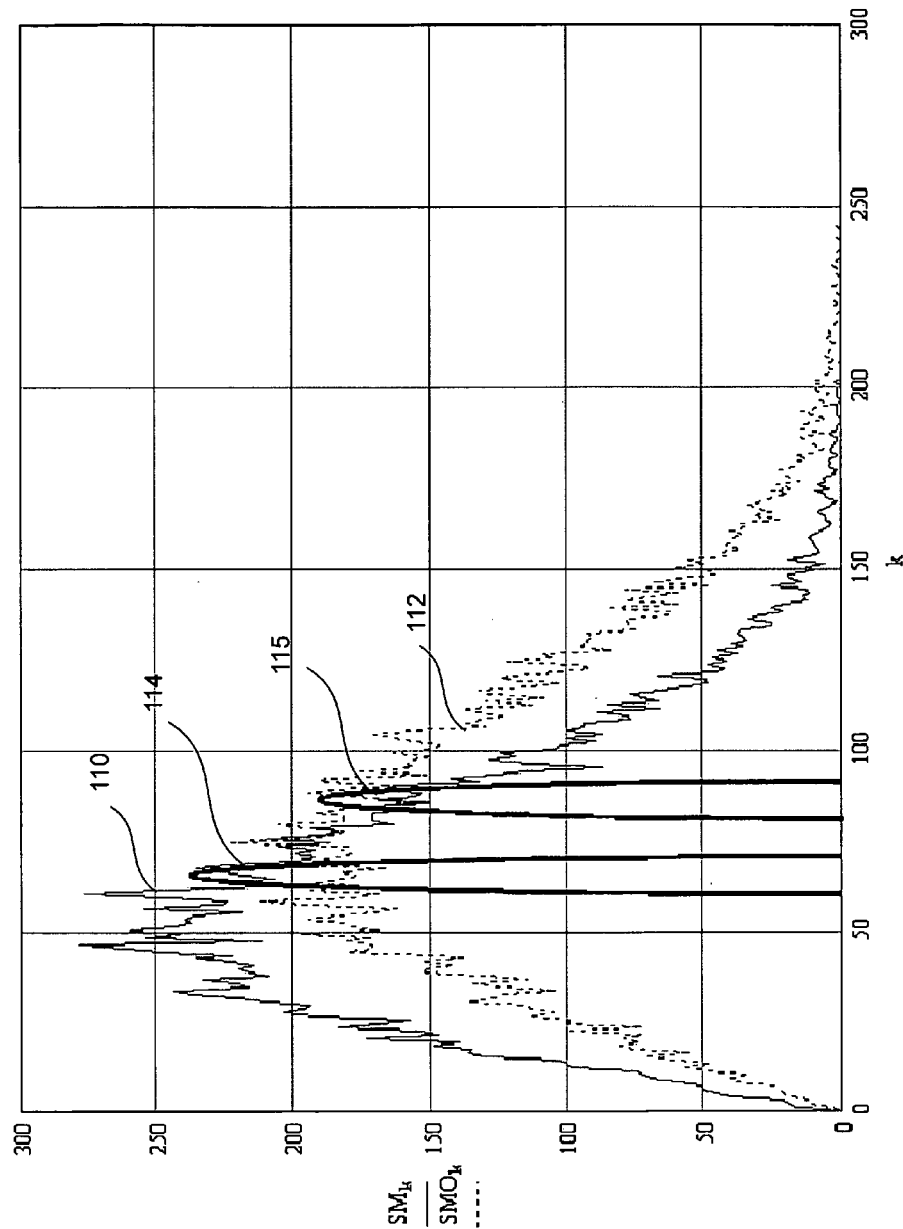
FIG. 8 shows the noise residual Rayleigh distribution function for the correct path and an incorrect path offset by the minimum constellation nearest neighbor distance of this 64-QAM example.

The correct path metric is composed of the sum of all the correct path residuals whose residual magnitude PDF is the Rayleigh distribution illustrated in FIG. 8. As is well known by those skilled in the art, the mode (peak of the distribution) is the most frequent residual value and is equal to the sigma of the 2-dimensional Gaussian noise distribution. The mean is equal to sigma times the square root of pi over 2 and the standard deviation is equal to sigma times the square root of 4 minus pi over 2.

If a number (n) of correct path residuals are averaged, the resulting distribution is equal to the $n^{th}$ convolution of the Rayleigh distribution. However, by the Central Limit Theorem, the mean of this sum will be equal to the mean of the Rayleigh distribution and the standard deviation will be equal to standard deviation of the Rayleigh distribution divided by the square root of n as is well known by those skilled in the art.

The path metric of any incorrect path is composed of the sum of all the incorrect path's residual. An incorrect path residual has the same received noise distribution as the correct path, but it also has an offset bias related to the distance between the hypothesized transmit symbol and the symbol actually transmitted (between symbols 100 and 35 for example in FIG. 7). For a few path residuals, the bias may be zero since symbol constellation points in this 64-QAM example are shared. For other path residuals, the average bias will be equal to the distance between nearest neighbor constellation points. However, for the majority of paths the residual will be much greater than nearest neighbor points, in which case the branch will not be spawned.

FIG. 8 illustrates Rayleigh residual PDFs 110 and 112 for 20,000 noise samples at a 6 dB SNR for the correct path and incorrect path respectively when the incorrect path is offset by the minimum constellation nearest neighbor distance for this 64-QAM example. If a number of residuals from these two distributions are averaged, the correct path average will be lower than the incorrect path average.

If a large number of residuals are averaged, tight averaged sample distributions 114 and 115 will be obtained for the correct path and incorrect path respectively as illustrated in FIG. 8. Averaged sample distributions 114 and 115 show that even if all the incorrect path residuals were those residuals due to the constellation's minimum nearest neighbor distance, the correct path could still be identified by its lower average if the residual sample size were large enough (path long enough).

Averaged sample distributions 114 and 115 illustrate that incorrect paths can also be eliminated by forming residual sample averages for each path and paths eliminated if the average exceeds a predetermined threshold based on design SER.

For example, every 4 residuals of a path could be averaged and compared to a threshold. Two of these 4 residual averages could also be averaged and compared to another threshold. This process could be further repeated for additional larger groups of 16 and 32 residuals. This technique achieves the goal of eliminating paths as quickly as possible before the total number of paths gets too large.

The simplest path elimination technique is to just eliminate all branches that exceed the minimum path metric (assumed to be the correct path) by a fixed threshold. At high SNR, this technique is all that is required because the large contrast between correct and incorrect path metrics keeps the number of paths in play small.

In reality, incorrect path residuals tend to be very large whenever the hypothesized transmit symbol differs by a large constellation distance from the transmitted symbol. If all 8 spawned branches are eliminated, the entire cumulative path is eliminated. Thus, most incorrect paths don't exist for very long before they are eliminated.

Figure 9:
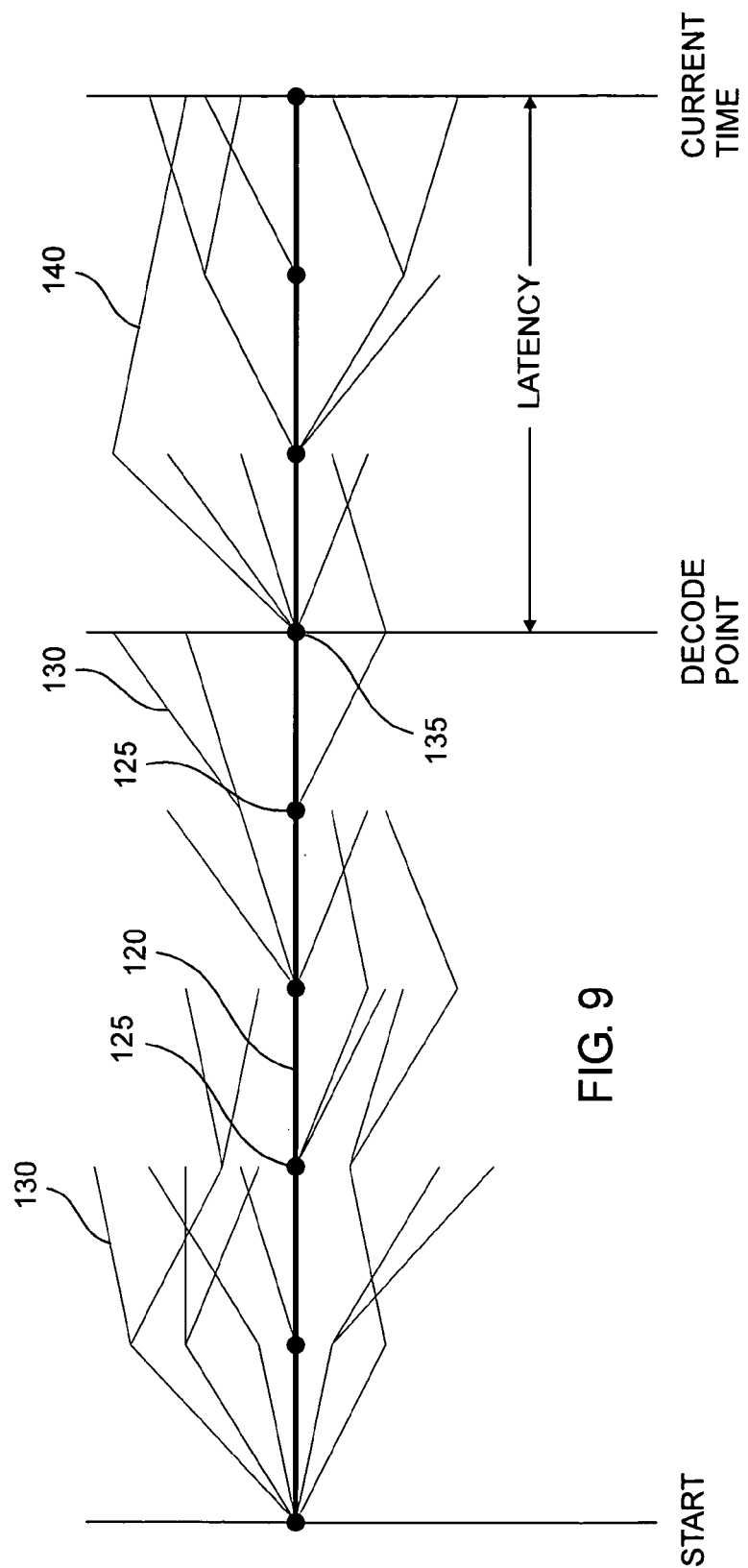
FIG. 9 illustrates the early termination of incorrect paths.

The basis for this code's performance is the fact that the path metric for the correct path is due to noise only and is totally unbiased by incorrect symbols. In contrast, all other paths contain a residual bias. Just like playing roulette in Vegas, an incorrect path may win in the short term (have a lower metric than the correct path) but will always lose over the long term (have a higher metric then the correct path). As long as the correct path is not eliminated, it will eventually always be the path from which all other paths are spawned. This is illustrated in FIG. 9 where the bold center line 120 represents the correct path, the dots 125 represent symbol times, and the fine lines 130 represent incorrect paths.

As a consequence, this code's performance is set by the number of paths it can handle. Performance close to the Shannon bound can be obtained if adequate hardware resources are provided to support the large number of paths in play that occur at low SNR.

At low SNR, both the residual and metric path elimination thresholds must be increased to prevent the elimination of the correct path. Consequently, many more paths are in play for longer periods of time which increase the required processing and memory resources.

All paths can trace their origin back to the first symbol received. However, all incorrect paths, and the paths they spawn, eventually get eliminated due to either high residuals or high path metrics. Therefore, by placing the path decode point 135 behind the longest incorrect path 140, any current path history can be decoded to correctly indicate the correct path history prior to the decode point.

Alternatively, a counter can be used to indicate the number of consecutive times a path is the minimum metric path. If the minimum metric path is the correct path, the counter will reach a relatively high count. If not the correct path, the counter will not reach a very high count because the minimum path will arbitrarily shift from one incorrect path to another.

If the minimum path counter exceeds a threshold based on design SER, that path can be used to decode the correct path at a point earlier than the decode point. This reduces the code latency.

This coding approach has the advantage that it has low latency compared to turbo codes and the same simple processing structure can be used for a wide range of bandwidth efficiency (bits-per-symbol) and design SER. The performance is primarily selected by the maximum number of active paths the hardware is designed to process.

The decoding structure also makes the use of lookup tables and parallel processing simple and straight forward to implement in hardware, which greatly speeds up path processing since the total number of paths can be split up amongst the parallel hardware.

Figure 10:
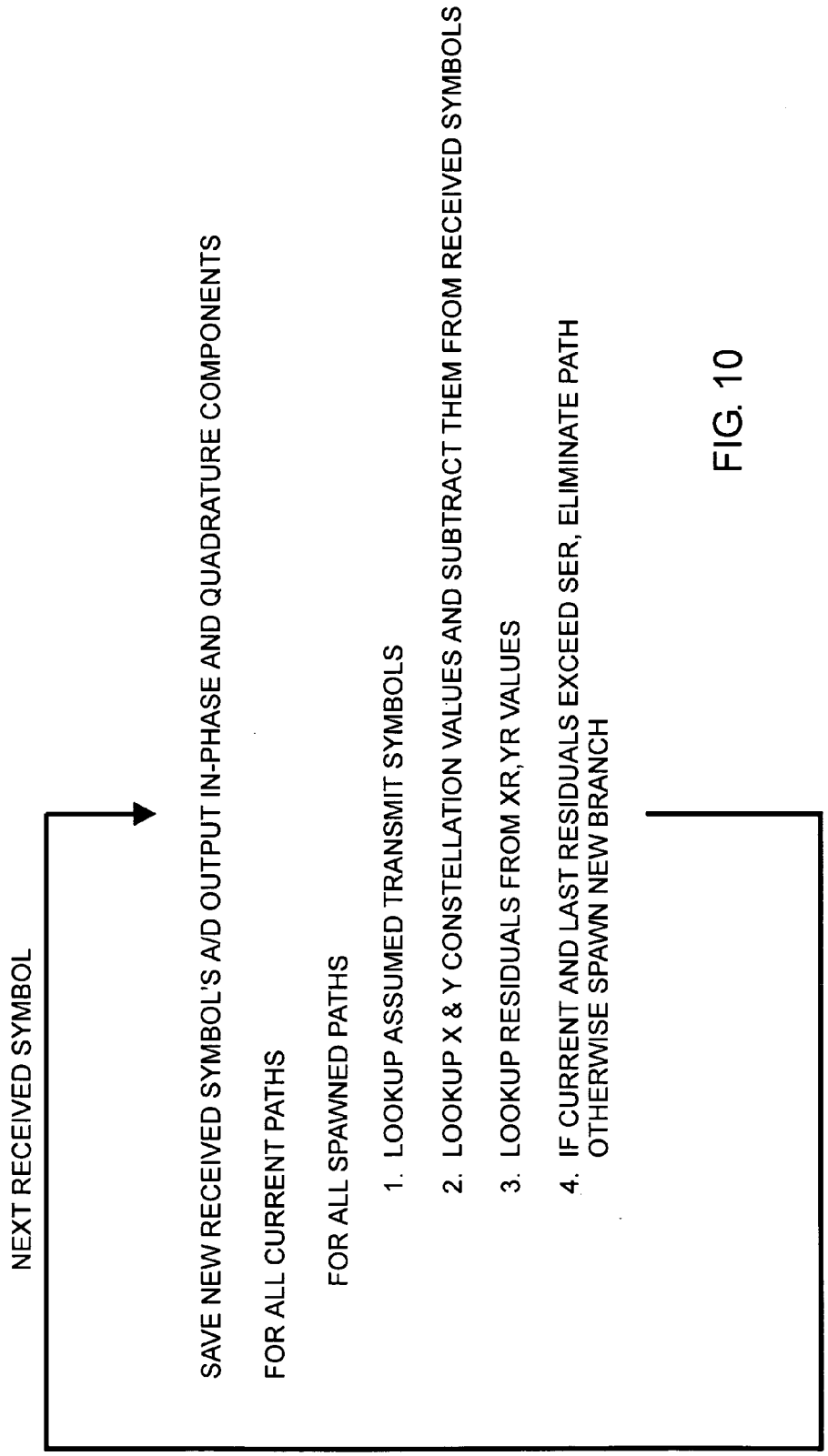
FIG. 10 shows a processing flowchart for a sequential decoder.

FIG. 10 illustrates a flowchart of the main decoding steps. Each new received symbol is temporarily stored in terms of its in-phase (I) and quadrature-phase (Q) components. A stored path is retrieved from memory and its hypothesized transmit symbols are retrieved from a lookup table.

Next, x and y cancellation values are retrieved from another lookup table for these hypothesized transmit signals and subtracted from the received symbol I and Q values. Entering the resulting hypothesized cancelled signal xr and yr residual values into a 2-dimensional residual lookup table, the residuals are calculated. The residual lookup table stores the square root of the sum of the squares of xr and yr (residual Euclidean distance between the received symbol 32 and the origin 35 in FIG. 4). The residual lookup table only has to support the xr and yr values for the selected design SER (maximum residual boundary 105 in FIG. 7).

Based on the current or accumulated path residuals, a new branch is either spawned or the current path eliminated. Spawning the branch involves creating a new path record from the spawning path and updating its parameters. In a like manner, the rest of the potential 8 branches are either spawned or their paths eliminated. This process is repeated for all current paths in play.

The number of paths in play is highly variable over time depending on how many paths happen to have residuals and metrics close to the correct path. However, most paths will eliminate over a span of 10 to 20 symbols. An implementation technique to reduce the path storage requirements is to carry the calculation of a current path forward through a number of symbols before performing the calculations for the next current path.

This will increase the code latency by the number of symbols carried forward while at the same time decreasing the peak memory requirements. Memory is saved because, except for the correct path, all other paths (and the paths spawned by them) will terminate over the next 10 to 20 symbols anyway. By not processing all current paths at once, the spawned paths of all the current paths do not have to be temporally stored at the same time prior to their elimination, thus reducing peak memory requirements.

Figure 11:
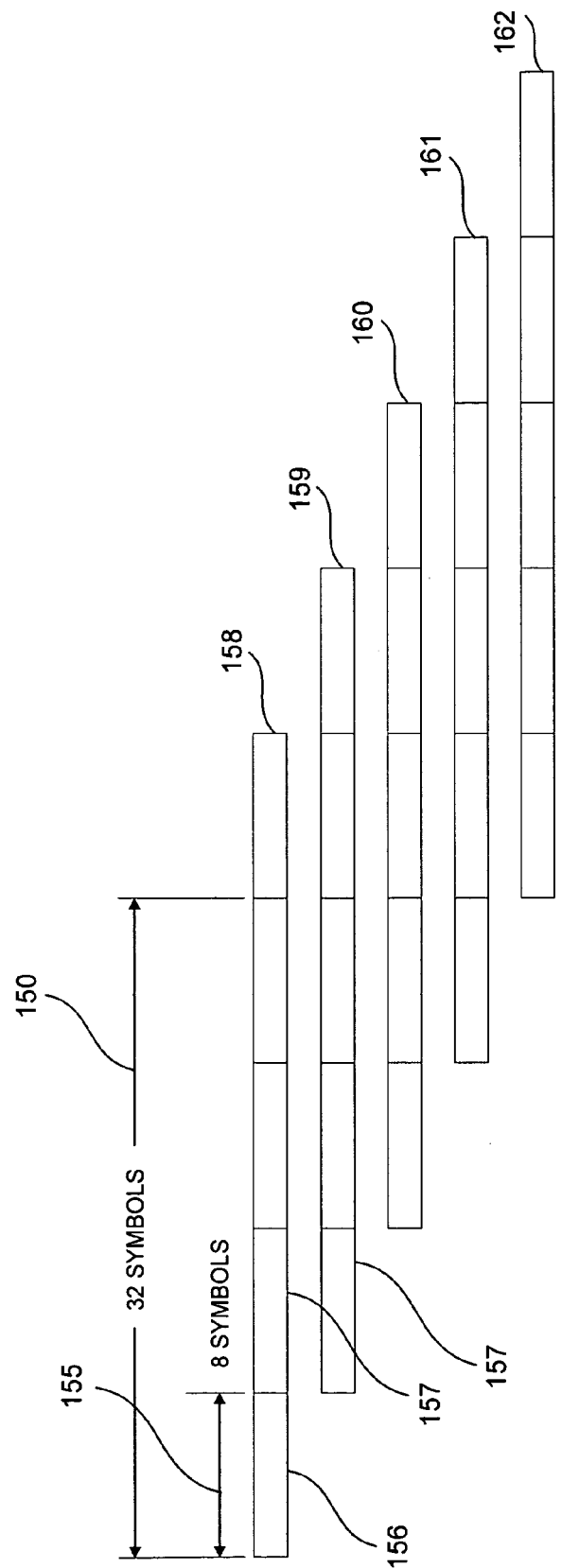
FIG. 11 shows an overlapping frame processing approach to limit the number of symbol errors when the correct path is lost.

If the correct path happens to get eliminated, it may take many symbols (thus giving many errors) before the correct path is acquired again. To prevent this, a frame size can be selected. This process is illustrated in FIG. 11 based on a path decoding latency of 32 symbols 150 and a frame size of 8 symbols 155. For this example, a new decoder is launched every 8 symbols and continued for 40 symbols. At the end of 32 symbols, the oldest symbol of the first decoder 158 is decoded for the next 8 symbols 156. The subsequent 8 symbols 157 are decoded using the second decoder 159 launched at the end of the first decoder's initial 8 symbols 156. Likewise, for the $3^{rd}$ through $5^{th}$ overlapping decoders 160 through 162 respectively.

In an AWGN environment, the correct path is lost when a noise sample or samples occur whose probability is less than the SER. By launching a new decoder that starts from an initial reset state every 8 symbols, a maximum of 8 symbol errors will be made due to an eliminated correct path caused by these low probability noise samples.

Although a frame size 155 of 8 and a decoding latency 150 of 32 was used in this example, many other values can be chosen depending on the particular communication application performance and hardware cost goals.

Figure 12:
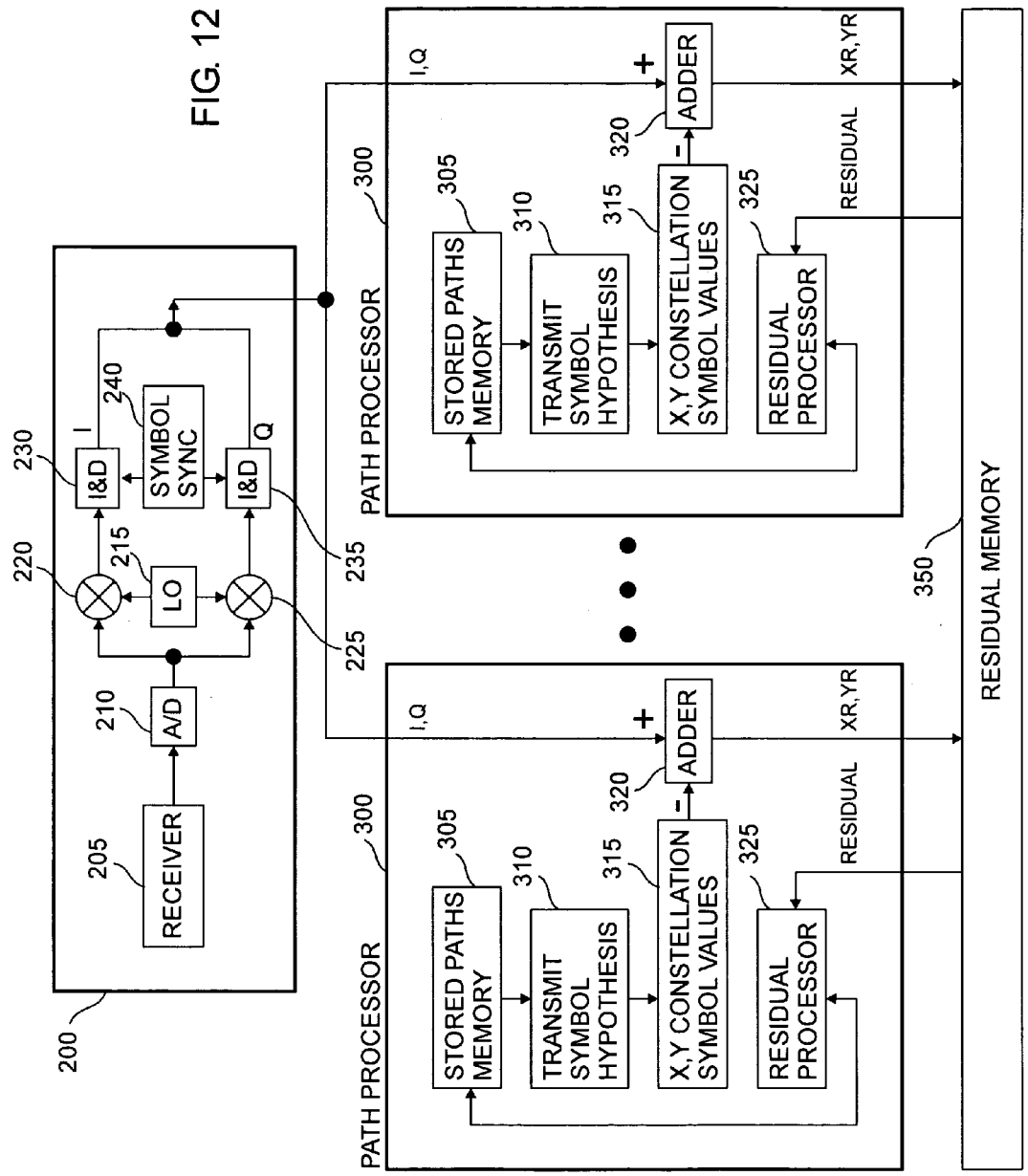
FIG. 12 shows a block diagram of a decoder that implements parallel path processing.

FIG. 12 illustrates one possible parallel hardware implementation of the invention decoder. A block diagram 200 of a generic code receiver consists of a receiver 205 and analog to digital converter (A/D) 210. The digitized samples from A/D 210 are downconverted to baseband using I mixer 220, Q mixer 225, and local oscillator (LO) 215. An I-channel integrate and dump (I&D) matched filter 230, Q-channel I&D matched filter 235, and symbol synchronizer 240 convert the received symbols to their I and Q components. These elements of block diagram 200 are very common and are well known to those skilled in the art.

Received symbol I and Q values are passed to parallel decoder path processors 300, each of which update a subset of all current decoder paths. For each path in stored path memory 305, the 8 possible hypothesized received 64-QAM symbols are retrieved from lookup table 310. The x,y voltage values for each symbol are retrieved from lookup table 315 and subtracted in adder 320 from the received symbol I,Q value latched by the I&D matched filters 230 and 235 to form the complex residual value xr,yr for the hypothesized transmit symbol. The magnitude of this complex residual value is obtained from 2-dimensional residual memory 350 and sent to the residual processor 325. The residual processor 325 combines this newest residual with the path's prior residuals and updates stored path memory 305 by either eliminating the path or spawning a new branch.

An overall coordination processor (not shown) manages the allocation of stored paths to the path processors 300 and handles the final decoding and output of code symbols. As well be obvious to anyone skilled in the art, path processors 300 and the coordination processor can be constructed either using separate physical hardware elements or using various blocks of hardware resources inside a single physical hardware element such as a Field Programmable Gate Array (FPGA). Likewise, many of the elements inside code receiver block 200 can also be implemented in the same FPGA.

Although this decoding method has been described for a particular 64-QAM constellation, additional QPSK constellation signals can be encoded to increase the bandwidth efficiency (bits per symbol). Combining additional QPSK constellations does not change the structure of the decoder. Instead, the size of the lookup tables simply increase along with the number of paths in play and the constellation points become denser.

In current high order coding constellation implementations, circuit imperfections that slightly alter the position of constellation points lead to rapid degradation of performance. Using the present invention decoder, all residuals are calculated between the received symbol and the hypothesized transmit symbol. By using a known training message, the x,y cancellation lookup tables can be easily adjusted to compensate for any circuit imperfections and thus match the receiver constellation points with the transmitter constellation points.

Alternatively, since the transmitted symbols are known, the actual received constellation point positions can be automatically calibrated during normal operation to remove circuit imperfections by continually modifying the cancellation x and y values. The correct modification can be automatically learned by monitoring the mean of the Gaussian distributed noise on the correct path. The mean of this noise will be zero for each constellation point when the calibration is correct. That is, the in-phase and quadrature-phase noise components of received symbol 32 with respect to transmit symbol 35 in FIG. 4 will both be zero when averaged over a large number of symbols along the correct path.

Coding methods have traditionally been compared using AWGN because it has been found that coding methods that excel against AWGN also excel in a non-AWGN environment.

This code's residual and metric path elimination techniques and thresholds have been described using AWGN. However, these techniques and thresholds can be modified to account for other noise environments.

For example, if occasional high amplitude noise spikes were a problem, path elimination decisions could be postponed until after 2 or 3 consecutive residuals were received to prevent eliminating the correct path based on a single high residual. Of course, this would increase the number of paths in play. However, other than the need for more path resources, the decoding structure would not change.

The code and decoding methods described in this invention are capable of operating very close to the Shannon capacity bound by providing adequate resources to handle the large number of paths in play at low signal to noise ratio.

In contrast with this code, the tree structure of a rate 1/2 convolutional code of constraint length K repeats itself after K branches. Any node having the same state label at the same time can be merged since all succeeding paths will be indistinguishable. The process of merging converts the tree structure to a trellis diagram. The basis of Viterbi decoding is that when 2 paths merge, one can be eliminated.

In Viterbi rate decoding with K equal to 11, the minimum free distance (sum of branch Hamming distance metrics) is 15. Therefore, the code can correct a minimum of 7 errors.

As is known by those skilled in the art, maximum minimum distance is not the key to reaching channel capacity. Instead, the code should be random-like. Random codes were used by Shannon to calculate the theoretical potential of channel coding.

Turbo and LDPC codes both use large pseudo-random interleavers in the encoder and decoder to yield near-Shannon-limit performance. In the case of turbo codes, error floors occur because turbo codes have relatively poor minimum distances, so ultimately performance is limited by the probability of confusing the transmitted codeword with a near neighbor.

LDPC codes will out perform turbo codes for very large block sizes and interleavers.

Thus, to produce near Shannon capacity codes, large blocks and interleavers are required to increase minimum distance between codewords and to increase the randomness of the codewords.

The code described in the present invention naturally has large minimum distances and randomness without the need for large block sizes.

Since codewords are composed from three independent data streams, the combined transmitted codeword is totally random. If tree branches ever merge, it will be long after incorrect paths have already terminated and new paths have come into play. Experiments have shown that 20 to 30 symbol errors (as defined by the correct path residual not being the minimum path residual) can occur at low SNR without either the correct path being lost or a decoder output error being made.

The Shannon capacity bound can be reached for any selected bandwidth efficiency simply by providing enough resources to handle the large number of paths in play. This characteristic could be useful in a space probe application where billions of paths in play could be stored and processed at leisure in non-real-time.

For commercial applications, Moore's law will provide increasingly large amounts of low-cost memory and parallel processing capability in the years ahead. Since parallel resources can easily split up and process subsets of the large number of paths in play, high bandwidth efficiency (bits per symbol) at high power efficiency (low Eb/N0) near the capacity bound (and with low latency) are possible with this code.

Current high order QAM constellations require complicated residual calculations since the distance to each of the many QAM symbols must be calculated. In contrast, all residuals in this code are calculated to the origin of the hypothesized received transmit symbol irrespective of the QAM order which allows the extensive use of lookup tables thus reducing the decoder complexity.

In summary, this encoder/decoder modulation and coding method invention combines lower order constellations into higher order constellations in a manner that allows the low order constellations to appear pseudo-orthogonal in the decoding process. By selecting the correct path through the decoder code tree, the low order constellation signals can be cancelled leaving only circuit and transmission noise. For any desired SER and noise statistics, the error-free correct path through the decoder can be retained and identified if adequate hardware and computational resources are provided.

The method and preferred embodiments of the invention have been illustrated and described in detail. However, it will be readily apparent to those skilled in the art that various modifications may be made therein without departing from the spirit of the invention.

APPENDIX

Communication Method and Apparatus

Background:

The goal of a modern digital communication system design is to send the maximum amount of information possible across a band-limited channel using the least amount of power. Specifically, the designer's goals are to maximize transmission bit rate R, minimize probability of bit error $P_b$, minimize the required bit energy to noise power $E_b/N_o$, and minimize the required system bandwidth W. However, these goals are in conflict with each other which necessitates the trading off of one system goal with another.

Modulation and coding techniques allow the designer to trade-off power and bandwidth to achieve a desired bit error rate (BER). This trade-off is illustrated via a family of $P_b$ versus $E_b/N_0$ curves for the coherent detection of orthogonal signaling and multiple phase signaling in FIG. 1 and FIG. 2. These signaling schemes are called M-ary because they process k bits per unit interval. The modulator uses one of its $M=2^k$ waveforms to represent each k-bit message sequence.

For orthogonal signal sets (FIG. 1), such as frequency shift keying (FSK) modulation, increasing the size of the symbol set reduces the $E_b/N_0$ required at the expense of more bandwidth. In FSK, different frequencies represent different symbols so the signals are orthogonal. That is, the transmission of one symbol doesn't effect the other symbols and all symbols require the same energy-per-symbol. Increasing the number of symbols increases the number of bits-per-symbol so the energy-per-bit decreases.

For non-orthogonal signal sets (FIG. 2), such as multiple phase shift keying (MPSK) modulation, increasing the size of the symbol set requires an increased $E_b/N_0$. In MPSK, different carrier phase increments represent different symbols. As the number of symbols increases, the spacing between phase increments decrease requiring more energy-per-symbol. Although the bandwidth doesn't increase, the required energy-per-symbol increases more than the bits-per-symbol thus requiring an increase in energy-per-bit.

Another designer option is to reduce power requirements using FEC codes. These codes insert structured redundancy into the source data so that the presence of errors can be detected and corrected. Two categories of FEC codes are block codes and convolutional codes. In the case of block codes, the source data is segmented into blocks of k message bits to which are appended n-k redundant bits to form a n-bit codeword. The ratio of message bits to codewords (k/n) is called the code rate. The code rate is the portion of the codeword that carries message information.

A convolutional code is described by the three integers n, k, and K, where the ratio k/n has the same code rate significance as for block codes. Convolutional codes are not formed into blocks as in block codes, but rather are formed continuously by an encoding shift register. The integer K is called the constraint length and the length of the encoding shift register is equal to K−1.

FEC codes correct some of the errors in the received data which allows a lower power to be used to transmit the data. Coding gain is defined as the reduction, expressed in decibels, in the required $E_b/N_0$ to achieve a specified error performance of a FEC coded system over an un-coded one with the same modulation. The coding performance for coherently demodulated BPSK over a Gaussian channel for several block codes is illustrated in FIG. 3 and for various convolutional codes in FIG. 4.

Block codes and convolutional codes achieve an improvement in BER by bandwidth expansion. That is, a k-bit message sequence is replaced by a n-bit codeword. To achieve the same message bit rate, the channel bandwidth would have to be increased by n/k.

Trellis-coded modulation (TCM) combines modulation and coding schemes to achieve coding gain without a bandwidth expansion. Redundancy is provided by increasing the signal alphabet through multilevel/phase signaling, so the channel bandwidth is not increased.

FEC coding is a mature field of communications technology. Many types of codes have been developed which are sometimes combined to achieve various performance goals. Previously, Viterbi convolutional codes combined with Reed-Solomon block codes have provided what were at one time viewed as being acceptable coding gains. But, the conventional TCM schemes and the convolutional encoding schemes failed to achieve the higher levels of performance that are now provided through the use of turbo codes. Turbo codes are two or higher dimensional block codes that use an iterative feedback decoding scheme. Unfortunately, turbo codes require processing over an extended time before final decisions are produced and therefore cause the communication system to experience undesirably lengthy latency periods. It is believed that the conventional TCM and convolutional encoding schemes failed to achieve the higher levels of performance due, at least in part, to an excessive sensitivity to small Euclidean distances (ED's) between nearest-neighbor phase points in a phase constellation.

Summary:

It is an advantage of at least one embodiment of the present invention that an improved communication method and apparatus are provided.

Another advantage of at least one embodiment of the present invention is that an apparatus and method for implementing digital communications using FEC coding are provided to achieve performance which matches or exceeds that of currently available codes in some applications.

Another advantage of at least one embodiment of the present invention is that a code made up of pseudo-orthogonal signals is transmitted so that the pseudo-orthogonal signals may be separated from one another in a receiver.

Another advantage of at least one embodiment of the present invention is that a phase-point constellation is compiled so that pseudo-orthogonal signals may be separated from one another in a receiver to lower sensitivity to Euclidean distances between nearest-neighbor points in the constellation.

Another advantage of at least one embodiment of the present invention is that performance on par with or exceeding that which is achievable through the use of turbo codes is achieved without causing the communication system to suffer from the excessive latency times which are characteristic of turbo codes.

These and other advantages are realized in one form by a method for communicating an n-bit codeword in a unit interval, where n=y+z and where n, y, and z are positive integers. The method calls for transmitting a transmit phase point selected from a constellation of phase points. A receive phase point responsive to the transmit phase point and to noise is generated. $2^z$ alternate hypotheses about potential combinations of the z bits of the n-bit codeword are formed. One of the $2^z$ hypotheses is correct and $2^z-1$ of the $2^z$ hypotheses are incorrect. A decoding process is applied to the $2^z$ alternate hypotheses to accept and reject the hypotheses in addition to counteracting the noise.

The above and other advantages are realized in another form by a receiver for use in a communication system in which a codeword transformed into a transmit phase point is transmitted during a unit interval. The receiver includes a receive phase point generator configured to generate a receive phase point responsive to the transmit phase point and to noise. A branch metrics generator is configured to define a plurality of offset phase points. Each of the offset phase points is responsive to the receive phase point. The branch metrics generator generates branch metrics that are responsive to the offset phase points. A decoder couples to the branch metrics generator.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a graph depicting $E_b/N_o$ versus bit error probabilities for FSK modulation;

FIG. 2 shows a graph depicting $E_b/N_o$ versus bit error probabilities for MPSK modulation;

FIG. 3 shows a graph depicting $E_b/N_o$ versus bit error probabilities for the transmission of coherently demodulated BPSK over a Gaussian channel using various block codes;

FIG. 4 shows a graph depicting $E_b/N_o$ versus bit error probabilities for the transmission of coherently demodulated BPSK over a Gaussian channel using various convolutional codes;

FIG. 5 shows a block diagram of one embodiment of a communication system configured in accordance with the teaching of the present invention;

FIG. 6 shows a time line of objects that are generated in the communication system of FIG. 5 over the course of successive unit intervals;

FIGS. 7A and 7B graphically show two independent QPSK signals that are vector-added together to achieve a phase point constellation consistent with the teaching of the present invention;

FIGS. 8A and 8B graphically show a 16-QAM phase point constellation that results from the vector summation of all possible values for the two independent QPSK signals depicted in FIGS. 7A and 7B;

FIGS. 9A-9D graphically illustrate the cancellation of a second QPSK signal from a signal defined by a 16-QAM phase point constellation which results from the vector addition of the second QPSK signal to a first QPSK signal;

FIGS. 10A-10D graphically illustrate offset phase points which result from a cancellation task when incorrect hypotheses are formed concerning the second QPSK signal;

FIG. 11 shows a block diagram of an FEC encoder configured as a rate 1/2 Viterbi code generator with a constraint length of 7;

FIG. 12 shows a notational scheme which corresponds with the operation of the FEC encoder depicted in FIG. 11;

FIG. 13 shows a tree diagram which illustrates the codewords and states for the first four input bits, assuming the shift register starts at the all zeros state;

FIG. 14 shows a tree diagram that indicates how two QPSK signals are independently encoded and yet form a common code tree;

FIG. 15 shows a trellis diagram formed from the tree diagram of FIG. 14;

FIG. 16 shows a flow chart of a Viterbi decoding algorithm that may be implemented by a decoder in a receiver of the communication system of FIG. 5;

FIG. 17 graphically shows the cancellation of an I1Q1 symbol from a receive phase point to leave an I2Q2 symbol;

FIG. 18 shows a flow chart of a sequential decoding algorithm that may be implemented by a decoder in a receiver of the communication system of FIG. 5;

FIGS. 19A-19C show a first 64-QAM embodiment of a phase point constellation built from three pseudo-orthogonal QPSK signals in a manner consistent with the teaching of the present invention;

FIG. 20 shows a tree diagram that indicates how the three QPSK signals from the example of FIGS. 19A-19C may be encoded; and FIGS. 21A and 21B show a second 64-QAM embodiment of a phase point constellation built from three pseudo-orthogonal QPSK signals in a manner consistent with the teaching of the present invention.

DETAILED DESCRIPTION OF THE PREFERRED EMBODIMENTS

Those skilled in the art will appreciate that the dimensionless ratio $E_b/N_0$ is a standard quality measure for digital communication system performance. The ratio $E_b/N_0$ can be evaluated as a metric that characterizes the performance of one system versus another. The smaller the required $E_b/N_0$ for a communication system, the more efficient the system modulation and detection process is for a given probability of error. Orthogonal signaling provides a lower $E_b/N_0$ at the expense of additional bandwidth. Multi-phase and multi-level signaling do not require additional bandwidth but require a higher $E_b/N_0$.

Quadrature phase shift keying (QPSK), however, allows a higher data rate compared to bi-phase shift keying (BPSK) without an increase in either bandwidth or $E_b/N_0$. It achieves this quality because the two signal components of QPSK are orthogonal. That is, the data rate doubles going from BPSK to QPSK without an increase in either bandwidth or $E_b/N_0$. QPSK signaling can be thought of as transmitting two independent BPSK signals in quadrature. Since the two signals are orthogonal, the detection of one BPSK signal does not interfere with the detection of the other quadrature BPSK signal.

The below-presented discussion about preferred embodiments of the present invention may be viewed as extending this BPSK to QPSK process further such that two independent QPSK signals could be combined in such a way that the detection of one QPSK signal would not interfere with the detection of the other QPSK signal. That is, in effect the two QPSK signals may be viewed as being pseudo-orthogonal to each other.

In one example, two QPSK signals are combined to produce a 16-point quadrature amplitude modulation (16-QAM) constellation. The signals are coded and combined in a manner that allows them to be separated in the demodulation and decoding process. In effect, the presence of the second QPSK signal doesn't interfere with the first QPSK signal and vice versa. That is, the signals are made pseudo-orthogonal via the encoding and decoding process.

This technique can also be applied to create higher order pseudo-orthogonal constellations. The natural extension is to combine 3 QPSK signals into 64-QAM and 4 QPSK signals into 256-QAM.

FIG. 5 shows a block diagram of one embodiment of a communication system 30 configured in accordance with the teaching of the present invention. As shown in FIG. 5, communication system 30 includes a transmitter 32 and a receiver 34. A communication signal 36 is applied by transmitter 32 to a channel 38 where it is invariably corrupted by noise 40, assumed to be additive Gaussian white noise (AGWN) herein, then obtained from the channel by receiver 34. While the preferred embodiment is specifically configured for a radio-frequency (rf) communication channel 38, communications through other types of channels 38 may also benefit from the teaching of the present invention. For example, channel 38 may alternatively convey signals acoustically, magnetically, or optically; or, channel 38 may be provided by a memory device to which data are written (transmitted), then later read (received).

FIG. 6 shows a time line of signal and/or data objects that are generated in communication system 30 over the course of successive unit intervals 42. Referring to FIGS. 5 and 6, during each unit interval 42, transmitter 32 receives a data message 44 at a terminal 46. Message 44 is the data that is to be conveyed through channel 38. And, message 44 is received at a rate of k bits per unit interval 42, where k is a positive integer. Transmitter 32 parses k-bit message 44 into two or more message streams, and routes the two or more message streams to independent, forward error correction (FEC) encoders 48. During each unit interval, encoders 48 collectively, but independently, convert a k-bit message 44 into an n-bit codeword 50, where n is a positive integer greater than k. Collectively, encoders 48 increase the data rate by adding systematic redundancy bits. Encoders 48 are discussed below in more detail.

During each unit interval 42, a phase mapping section 52 transforms an n-bit codeword 50 into a single complex transmit phase point 54 having in-phase (I) and quadrature-phase (Q) components. Transmit phase point 54 is selected from a constellation of phase points that are configured in a manner that is discussed in more detail below. Further, during each unit interval 42, a transmit phase point 54 is presented to a final transmit stage 56 where the transmit phase point 54 is processed for and applied to channel 38. Final transmit stage 54 may implement any of the variety of digital and analog processing tasks that are known to those skilled in the art, including upconversion to an RF frequency, band-pass filtering, power amplification, and broadcasting communication signal 36 from an antenna 58 into channel 38.

Communication signal 36, which is invariably corrupted with noise in channel 38 and the front end of receiver 34, is received at an antenna 60 of receiver 34. Antenna 60 couples to receive phase point generator 62, which serves as an initial receive stage of receiver 34. Receive phase point generator 62 performs conventional processing on communication signal 36 so as to produce a receive phase point 64 during each unit interval 42. This processing may include RF amplification, band-pass filtering, downconversion, equalization, frequency and phase synchronization, bit synchronization, digitization, and the like. Receive phase point 64 is a complex digital value having in-phase (I) and quadrature-phase (Q) components.

Ideally, each receive phase point 64 corresponds to a transmit phase point 54, an n-bit codeword 50, and a k-bit message 44, although it will be displaced in time. A receive phase point 64 will be displaced in time from its corresponding transmit phase point 54 due to processing in final transmit stage 56, propagation delay in channel 38, and processing in receive phase point generator 62. But a receive phase point 64 will invariably fail to precisely equal its corresponding transmit phase point 54 due in large part to the presence of noise 40. A receive phase point 64 will be displaced further in time from its corresponding n-bit codeword 50 due to processing in phase map 52, and displaced even further in time from a corresponding k-bit message 44 by processing in encoders 48.

During each unit interval 42, a receive phase point 64 is presented to a branch metrics generator 66. Branch metrics generator 66 performs two tasks in response to each receive phase point 64. Branch metrics generator 66 may be implemented using a memory device programmed to carry out the below-discussed features. Thus, both of these two tasks may take place in a single table-look-up operation, and both tasks can be performed implicitly through the relationships of the data programmed in the memory device. The two tasks are performed together through the relationships of input to output data programmed in the memory device.

In a first task, branch metrics generator 66 forms alternate hypotheses concerning a portion of the n-bit codeword 50 that corresponds to the receive phase point 64. Alternate hypotheses are formed to account for all potential combinations of z bits of the corresponding n-bit codeword 50, where z is a positive integer less than n. $2^z$ hypotheses are formed to correspond to all potential bit combinations of the z bits, and only one of the $2^z$ hypotheses is correct. The remaining $2^z-1$ hypotheses are incorrect. But at this point in the process of decoding the n-bit codeword 50, it is unknown which one of the $2^z$ hypotheses is the correct one and which ones are incorrect. The $2^z$ alternate hypotheses are formed by offsetting receive phase point 64 by $2^z$ different offset vectors, as is discussed in more detail below. For an example where the integer z equals two, this first task defines offset phase points 68a, 68b, 68c, and 68d. But there is no requirement that the integer z must equal two.

In a second task, branch metrics generator 66 generates branch metrics 70. Branch metrics 70 may be formed in roughly a conventional manner but with a couple of exceptions. Conventional branch metrics would describe probabilities of various transmit phase points having been transmitted given the fact that a particular receive phase point had been received. But branch metrics generator 66 does not generate such probabilities, as is discussed in more detail below. On the other hand, branch metrics generator 66 does generate branch metrics 70 that describe probabilities, and the probabilities are based on Euclidean distances (ED's).

For the purpose of this discussion, let y be a positive integer such that n=y+z. Thus, y represents the number of bits in n-bit codeword 50 about which no hypotheses are formed as discussed above in connection with the first task of branch metrics generator 66. As will be discussed in more detail below, each receive phase point 64 equals the vector sum of a first signal which is responsive to y bits of the n-bit codeword 50, a second signal which is responsive to z bits of the n-bit code word 50, and noise 40. Branch metrics generator 66 generates branch metrics 70 to be responsive to ED's between $2^y$ potential values of the first signal and the above-discussed $2^z$ offset phase points 68. A total of $2^y$ of branch metrics 70 are generated for each of the $2^z$ offset phase points 68, so that $2^{y+z}$ branch metrics 70 are generated during each unit interval 42.

Branch metrics 70 may be expressed as linear-likelihoods or as log-likelihoods. And in practice, branch metrics 70 may be configured so that larger ED's, which suggest lower probabilities, lead to larger branch metric 70 values, or configured so that smaller ED's, which suggest higher probabilities, lead to larger branch metric 70 values. But for the sake of consistency, in the discussion below, larger metrics will be associated with larger residuals and lower probabilities.

During each unit interval 42, branch metrics 70 are presented to a decoder 72. A variety of decoding techniques may be applied in decoder 72, and a few are discussed in more detail below. In general, the FEC encoding processes performed by encoders 48 and the redundancy bits added by encoders 48 allow decoder 72 to accumulate the probabilities defined by branch metrics generator 66 over many unit intervals 42 and select most-likely paths for use in providing an estimate 74 of k-bit message 44. The k-bit message estimate 74 is based on both the particular receive phase point 64 which corresponds most directly to the k-bit message 44 that is being estimated and the immediate history of offset phase points 68.

Due to the use of offset phase points 68 defined in branch metrics generator 66, decoder 72 decodes a collection of offset phase points 68 rather than a single receive phase point 64. In particular, decoder 72 functions to accept and reject the alternate hypotheses posed by offset phase points 68 in addition to the traditional role of counteracting noise 40. As will become evident from the below-presented discussion, in any given unit interval 42 offset phase points 68 which result from incorrect hypotheses will, on average, lead to large residual values. Often, these residuals values will be quite large. Thus, offsets 68 resulting from incorrect hypotheses appear to decoder 72, on average over a series of several unit intervals 42, as though they are far too distance in phase space from a comparison point to suggest valid data.

In general, transmitter 32 combines lower order constellations into a higher order constellation in such a manner that the lower order constellations appear orthogonal in decoder 72. FIGS. 7A and 7B illustrate one example in which two QPSK signals 76 and 78 can be combined by vector, or complex, addition to achieve this goal. Those skilled in the art will appreciate that vector addition is a linear process that allows the two signals to be separated from one another by a complementary linear process of vector, or complex, subtraction in branch metrics generator 66 of receiver 34.

FIGS. 7A and 7B illustrate that the axes of second QPSK signal 78 are rotated 45 degrees with respect to first QPSK signal 76. Each of QPSK signals 76 and 78 exhibit, during any single unit interval 42, one of four potential values, depicted as points 80 for signal 76 in FIG. 7A and points 82 for signal 78 in FIG. 7B. Points 80 and 82 are also referred to as symbols herein. The four potential values for points 80 or for points 82 exhibit equal magnitudes, and each value is rotated 90 degrees from two other ones of the four potential values.

FIGS. 8A and 8B graphically show a 16-QAM phase point constellation 84 that results from the vector summation of all possible values for the two independent QPSK signals 76 and 78 individually depicted in FIGS. 7A and 7B. In effect, the vector addition of second QPSK signal 78 to first QPSK signal 76 causes the origin of the rotated I2Q2 axis for signal 78 to be placed at each symbol in the I1Q1 sub-constellation of signal 76. FIG. 8A illustrates the vector addition of all potential values for second QPSK signal 78, to the "11" point 80 in the I1Q1 sub-constellation of signal 76, depicted as a phase-space vector 86. FIG. 8A also illustrates a phase-space vector 88 extending from the I2Q2 origin to the "11" point 82 in the I2Q2 sub-constellation of signal 78. The result of the vector addition process is the phase point 90, depicted by a phase-space vector 92, which results from adding a value of "11" for first QPSK signal 76 and a value of "11" for second QPSK signal 78. Similarly adding the I2Q2 origin to the other three symbols in the I1Q1 constellation creates the 16-QAM constellation 84 shown in FIG. 8B. Phase points 90 serve as transmit phase points 54.

Thus, each of phase points 80 defines its own phase-space vector 86 with respect to the origin of its constellation, and each of phase points 82 defines its own phase-space vector 88 with respect to the origin of its constellation. Each phase point 90 in constellation 84 is likewise characterized by its own phase-space vector 92. In the preferred embodiment, each of phase-space vectors 86 exhibits substantially equal magnitude to phase-space vectors 88, but this is not a requirement. Equal magnitude phase-space vectors 86 and 88 prevent branch metric calculations from being dominated by the influence of a smaller magnitude phase-space vector.

For each 16-QAM symbol received at receiver 34, $2^z$ hypotheses are made in branch metrics generator 66 as to which I2Q2 symbol was transmitted and that symbol is effectively subtracted or cancelled from receive phase point 64 to form offset phase points 68. In effect, this converts 16-QAM constellation 84 back to the original I1Q1 QPSK sub-constellation of signal 76. In other words, for each hypothesis about which I2Q2 symbol was transmitted, the interference of the I2Q2 symbol is removed from the I1Q1 symbol.

FIGS. 9A-9D graphically illustrate the cancellation of each of the I2Q2 symbols for second QPSK signal 78 for arbitrary examples of received phase points 64. This cancellation task produces offset phase points 68. For example, referring to FIG. 9A, assume that the I1Q1="11" symbol 80, I2Q2="00" symbol 82 was transmitted and noise 40 placed the corresponding receive phase point 64 slightly to the right of the noise-free symbol location. For the hypothesis where branch metrics generator 66 assumes the I2Q2 symbol 82 transmitted was "00", which is the correct hypothesis in this example, the signal voltage due to a "00" symbol 82 is removed or cancelled from the receive phase point 64 by a vector addition operation to produce offset phase point 68a. This cancellation task places offset phase point 68a at the same point, with respect to the I1Q1="11" symbol 80, as it would have been had only the I1Q1 symbol 80 been transmitted. In effect, I2Q2 signal 78 is removed and the received signal reverts back to the original I1Q1 QPSK signal 76. FIGS. 9B-9D illustrate the received signal voltage movements for examples of receive point 64 with equivalent noise components. The FIGS. 9B-9D examples are for when the other three I2Q2 symbols are cancelled in accordance with other ones of the $2^z$ hypotheses to form offset phase points 68b, 68c, and 68d.

FIGS. 10A-10D graphically illustrate the offset phase points 68 which result from the cancellation task in branch metrics generator 66 when incorrect hypotheses are formed concerning which symbol 82 was transmitted for second QPSK signal 78. FIGS. 10A-10D are directed to the 16-QAM example also depicted in FIGS. 8-9. Referring to FIG. 10A, assume that the I1Q1="11" symbol 80, I2Q2="11" symbol 82 was transmitted. Also assume that noise 40 placed receive phase point 64 slightly to the right and above the noise-free symbol location. When branch metrics generator 66 forms the incorrect hypothesis that the I2Q2="00" symbol 82 was transmitted, then the signal voltage due to a I2Q2="00" symbol 82 is removed, in effect, which places the resulting offset phase point 68a further above the I1Q1 constellation.

The error residuals associated with this incorrectly placed offset phase point 68 are defined as the distance from the offset phase point 68 to each of the correct I1Q1 symbols 80. That is, the residual from the I1Q1="01" symbol 80, based on the hypothesis that the I2Q2="00" symbol 82 was transmitted, is designated R10 and is defined as the Euclidean distance (ED) between offset phase point 68a, which results from a vector addition operation that cancels the I2Q2="00" symbol 82 from the receive phase point 64 in accordance with that hypothesis, and the I1Q1="01" symbol 80. For each unit interval 42, branch metrics generator 66 generates a single metric 70 which is a function of this residual. FIG. 10A also shows residuals R00, R20, and R30 which are defined in branch metrics generator 66 to characterize ED's from offset phase point 68a and the other potential values for symbol 80. Corresponding branch metrics 70 are generated during each unit interval 42.

Referring to FIGS. 10A-10D, in a like manner the residuals to each of the $2^y$ I1Q1 symbols 80 are calculated based on the $2^z$ offset phase points 68 which are defined as a result of the alternate hypotheses formed based on the $2^1$ different symbols 82 that may be transmitted for the I2Q2 signal 78. FIG. 10B depicts residuals R01, R11, R21, and R31 which are defined in branch metrics generator 66 to characterize ED's from offset phase point 68b and all potential values for symbol 80. FIG. 10C depicts residuals R03, R13, R23, and R33 which are defined to characterize ED's from offset phase point 68c and all potential values for symbol 80. And, FIG. 10D depicts residuals R02, R12, R22, and R32 which are defined to characterize ED's from offset phase point 68d and all potential values for symbol 80. $2^{y+z}$, which equals 16 for the 16-QAM example of FIGS. 10A-10D, residuals are defined. In this example, the smallest residual is R33 (FIG. 10C) which results from the only correct one of the $2^z$ alternate hypothesis.

In coding, n-k redundancy bits are added to a k-bit message 44 to produce an n-bit codeword 50 which is transmitted by transmitter 32. Only a portion of all the possible n-bit sequences are codewords 50. At receiver 34, noise 40 may corrupt the received n-bit sequence 50 into a sequence that is not a codeword. This alerts receiver 34 that the received n-bit sequence is in error. To correct the error, decoder 72 in receiver 34 selects the n-bit codeword 50 that is "closest" to the received n-bit sequence and extracts the k-bit message estimate 74. As long as the received n-bit sequence is closer to the correct codeword 50, than any other codeword, the k-bit message 44 will be received error-free.

Coding allows receiver 34 to determine which I2Q2 symbol 82 was added to make the 16-QAM symbol 90 and therefore which symbol 82 needs to be canceled to convert the 16-QAM symbols back to I1Q1 QPSK symbols 80. In other words, coding allows receiver 34 to accept and reject the $2^z$ alternate hypotheses defined by branch metrics generator 66. Either block codes or convolutional coding could be used.

FIG. 11 shows a block diagram of an FEC encoder 48 configured as a rate 1/2 Viterbi code generator with a constraint length of 7. Those skilled in the art will appreciate that encoders 48 are not limited to only this configuration but that a wide variety of convolutional and block FEC encoding schemes may be implemented in accordance with the teaching of the present invention. To generate the convolutional code in encoder 48, sequential input bits from k-bit message 44 are shifted through a 6-bit shift register and a combination of shift register bits are added in two modulo-2 adders. For each input bit, a 2-bit output codeword is produced. The state of the code is defined by the state of the shift register. Since this shift register has six registers, there are $2^6=64$ code states. Each input to the generator produces a codeword and a new ending state, based on the input bit and the beginning state.

FIG. 12 shows a notational scheme which corresponds with the operation of an FEC encoder 48 which implements a rate 1/2 Viterbi code generator with a constraint length of 7. The rectangular shaped box in FIG. 12 defines the codeword and ending state based on the beginning state for an input bit of either "0" or "1".

FIG. 13 shows a tree diagram which illustrates the codewords and states for the first four input bits to encoder 48, assuming the shift register starts at the all zeros state. For example, if the first input bit is a "0", the first codeword is "00" and the ending state is "0". If a "1" is input, the codeword is "11" and the ending state is "32" or "100000" in binary notation.

The Viterbi decoding algorithm is well known and will not be repeated in detail here. In general, in accordance with the Viterbi decoding algorithm, a trellis diagram is constructed which defines all the possible states, codewords, and branches. Whenever paths in the trellis merge to a particular state, the path with the largest metric (least probable) can be eliminated. The path metric is computed by adding the individual error residuals or branch metrics between the currently received codeword (symbol) and the branch codeword for all branches that make up that path. The final surviving path with the smallest metric defines the most probable transmitted codewords. The message bits are extracted as part of the decoding algorithm.

FIG. 14 shows a tree diagram that indicates how two QPSK signals are independently encoded and yet form a common code tree. A first FEC encoder 48a is used to encode the I1Q1 symbols 80 and a second FEC encoder 48b for the I2Q2 symbols 82. More specifically, encoder 48a converts a k1-bit message into a y-bit codeword by following a first encoding process, such as the rate 1/2, K=7, convolutional encoding process depicted in FIG. 11, where k1 is a positive integer less than both k and y. Encoder 48b simultaneously converts a k2-bit message into a z-bit codeword by following a second encoding process, which may also be a the rate 1/2, K=7, convolutional encoding process depicted in FIG. 11, where k2 is a positive integer less than both k and z. But the two encoders 48a and 48b implement different encoding processes because they process different input data causing them to traverse different states and causing the current and past states of one encoding process to exert no influence over the future states of the other. The n-bit codeword 50 results from combining the y-bit codeword with the z-bit codeword. For the example where two QPSK signals 76 and 78 (FIGS. 7A-7B) are encoded for a rate 1/2, 16-QAM in which 2-bit messages 44 are encoded into 4-bit codewords 50 per unit interval 42, k=2, k1=1, k2=1, n=4, y=2, and z=2.

During a unit interval t1, the 2-bit codeword from the first generator 48a selects the I1Q1 QPSK symbol 80 in phase map section 52. Also during unit interval t1, the second generator 48b selects the I2Q2 QPSK symbol 82 in phase map section 52. These two symbols 80 and 82 are vector added in phase map section 52 to produce the first 16-QAM symbol 90 (FIG. 8B) which is transmitted. In the preferred embodiment, phase map section 52 is implemented in a memory look-up table. Thus, transmit phase point data stored in the memory represent the phase rotation depicted above in FIG. 7B and the vector addition result depicted in FIG. 8B for all combinations of symbols 80 and 82. But this form of implementation is not a requirement of the present invention.

At decoder 72 in receiver 34, there are four possible paths through the code tree for the first symbol 90 as indicated by the I1Q1 states at unit interval t2. For the second symbol 90, there are 16 possible paths as indicated by the I1Q1 states at unit interval t3. The most probable path is the one with the smallest path metric which is computed by adding the two residuals along the path entering the state at time t3.

For example, if the first symbol 90 transmitted was I1Q1="11", I2Q2="00" and the second symbol 90 transmitted was I1Q1="10", I2Q2="11", the path indicated by the heavy line in FIG. 14 should have the smallest path metric. Note that the ending state for I1Q1 at any current symbol time is also the beginning state for I1Q1 at its next symbol time. Likewise, the ending state for I2Q2 at any current symbol time is also the beginning state for I2Q2 at its next symbol time. This reflects the use of independent encoders 48, each of which applies its own encoding process to encode different, pseudo-orthogonal portions of the n-bit codeword 50.

In a manner understood by those skilled in the art, the Viterbi decoding algorithm converts the encoder tree representation into a decoder trellis diagram and selects the path through the trellis as the one with the smallest metric. The encoder tree illustrated in FIG. 14 is somewhat similar to that used in TCM. However, other decoding algorithms such as sequential decoding can also be used. In fact, block codes could even be used to indicate the minimum metric path through the code tree.

However, irrespective of which decoding method is used, if the error-free path is taken, which is the path that results from branch metrics generated in accordance with the single correct hypothesis made in branch metrics generator 66 during each unit interval 42, then the two QPSK signals are effectively orthogonal. That is, along the correct path, the second QPSK signal 78 is completely cancelled and has no influence on the first QPSK signal 76. Therefore, the first QPSK signal 76 is decoded as though it were the only signal transmitted.

For example, it requires an $E_b/N_0$ of 4.5 dB to decode QPSK at a $2 \times 10^{-5}$ BER using standard rate Viterbi decoding of constraint length 7. It requires less than another dB to decode 16-QAM using this pseudo-orthogonal coding method. This $E_b/N_0$ increase is due to the increased power in the FIG. 8B 16QAM constellation with respect to the power in either the I1Q1 or I2Q2 QPSK constellations individually.

FIG. 15 shows a trellis diagram formed from the tree diagram of FIG. 14. FIG. 15 depicts an example of a Viterbi type of decoder 72. At the start of unit interval t2, the two lower paths converge to state 0 and the two upper paths converge to state 32. If we assume the correct path residual R30 is less than the incorrect path residual R33, then the Viterbi algorithm eliminates the R33 path and keeps the R30 path. Likewise, if we assume the incorrect path R03 residual is less than the incorrect path R00 residual, then the R03 path is retained and the R00 path eliminated.

At the start of unit interval t3, two paths are converging on each of the states 0, 32, 16, and 48. Again, the Viterbi algorithm retains the path with the lowest residual and eliminates the path with the largest residual. This process is repeated for every decoding state time.

After at least 5 times the code constraint length, the path with the smallest metric is traced back, and the I0Q0, I1Q1 message symbols for the oldest state are hard-decoded as k-bit message estimate 74.

FIG. 16 shows a flow chart of a Viterbi decoding algorithm that may be implemented by branch metrics generator 66 and decoder 72 in receiver 34 of communication system 30. In the algorithm of FIG. 16, the message symbol is decoded after 64 state times (N=64). Following the algorithm of FIG. 16, after the trellis diagram is fully developed all states will be present. Residuals are calculated for all possible paths and all paths into each new state are eliminated except for the minimum path. Starting at state time 65, the oldest message symbol associated with the minimum residual path is decoded.

In the examples illustrated above, the I1Q1 symbols 80 were considered the desired symbols and the I2Q2 symbols 82 were considered the interfering symbols. At branch metrics generator 66 in receiver 34, however, the I2Q2 symbols 82 can be treated as the desired symbols and the I1Q1 symbols 80 as the interfering symbols.

FIG. 17 graphically shows the cancellation of a I1Q1 symbol 80 from a receive phase point 64 to leave an I2Q2 symbol 82. In FIG. 17, the I2Q2 symbols 82 are projected onto the I1Q1 axis. For the case in FIG. 17 where the I1Q1="11" symbol 80, I2Q2="00" symbol 82 was transmitted, the I1Q1="11" symbol 80 is canceled which moves the noise corrupted offset phase point close to the noise free I2Q2="00" symbol. The residuals are indicated.

Entering the residuals obtained by canceling the I1Q1 symbols 80 into the Viterbi decoder will cause a different path to be taken through the decoder trellis. At low signal levels, the error rate and location of the errors can be different from those obtained by canceling I2Q2.

This allows a separate Viterbi decoder to be used for each set of residuals and their path metrics to be compared to select the path with the smallest metric. Alternatively, the I1Q1 symbols 80 could be determined using a first Viterbi decoder on the 16-QAM constellation as just described. These symbols could then be canceled to produce a I2Q2 QPSK constellation. The I2Q2 symbols 82 could then be decoded using a standard QPSK Viterbi decoder.

Additionally, different code generators 48 could be used to encode the two separate QPSK signals 76 and 78. Different code generators would tend to place errors at different locations which would increase the probability of correcting them by comparing metrics between the two Viterbi decoders. Finally, since the message stream 50 is encoded using separate codes, the two Viterbi decoders could be used in an iterative feedback fashion similar to turbo codes. That is, multiple passes could alternatively be made through each of the decoders and the metrics updated and improved after each pass.

However, configuring decoder 72 to implement a sequential decoding algorithm, as described below, appears to provide particularly beneficial results. Simulations, using this technique, indicate that an $E_b/N_o$ of only 2 dB is required to decode 16-QAM at a BER of $5 \times 10^{-5}$ that was encoded using a Viterbi rate code of constraint length 7. This is within 0.25 dB of the Shannon capacity bound for a rate 1/2 signal. Using a longer constraint length would place the performance even closer to the bound.

The large error path residuals, associated with the pseudo-orthogonal coding technique discussed herein, allows an efficient sequential decoder algorithm to be implemented. In a sequential decoder, all paths through the trellis are retained until it is nearly certain that a particular path cannot be the correct path. Typically, the metric used to eliminate paths is the value of the residuals.

Since the number of possible paths through the trellis increase exponentially, erroneous paths are desirably identified and eliminated quickly or the decoder hardware size becomes unreasonable. But the large erroneous path residuals (i.e., branch metrics) resulting from the above-described techniques, allows a powerful sequential decoder to be implemented with reasonable hardware resources.

Specifically, all paths are retained in decoder 72 until the path residual exceeds the minimum path residual plus a threshold value. The threshold value is selected based on a tradeoff between the desired minimum $E_b/N_0$ operating point and the required decoder resources.

A flowchart of this sequential decoding technique is illustrated in FIG. 18. The sequential decoding algorithm of FIG. 18 is similar to Viterbi decoding except that all paths in the Viterbi algorithm of FIG. 16 are retained until they become too large.

Coding performance also increases as the trace back distance becomes larger because the longer paths provide more opportunity to throw out wrong paths. That is, noise may occasionally make the correct path residual larger than a particular wrong path over short time periods. However, statistically the residuals of wrong paths increase faster than the residual of the correct path, as the path length increases, because making the wrong assumption pushes the input symbol away from the correct symbol. This artificially increases wrong path residuals more than noise increases the correct path residual.

FIGS. 19A-19C show a first 64-QAM embodiment of a phase point constellation 84 consistent with the teaching of the present invention. In the embodiment of FIGS. 19A-19C, the above-discussed modulation and coding techniques are extended to include additional QPSK signals. Referring briefly to FIG. 5, a FEC encoder 48c is included in addition to encoders 48a and 48b to encode a 1-bit per unit interval 42 message stream parsed out from k-bit message stream 44. Encoder 48c would be omitted for the 16-QAM example discussed above. Where n-bit codeword 50 was provided above in the 16-QAM example by the combination of a y-bit codeword from FEC encoder 48a and a z-bit codeword from FEC encoder 48b, n-bit codeword 50 is now provided by the combination of a y-bit codeword from encoder 48a and a z-bit codeword from encoders 48b and 48c. In each unit interval 42, encoder 48b provides a z1-bit codeword, encoder 48c provides a z2-bit codeword, and z=z1+z2, where z, z1, and z2 are positive integers.

In FIG. 19A, the 16-QAM constellation formed from I1Q1 and I2Q2 in the previous example is added to a new I0Q0 QPSK constellation whose amplitude is twice that of the I1Q1 and I2Q2 constellations. If the I0Q0="11", I1Q1="11", I2Q2="00" symbol 94 serves as transmit phase point 54 and is transmitted, it equals the vector sum of a phase-space vector 86 corresponding to the I0Q0="11" symbol 80, a phase-space vector 96 corresponding to I1Q1="11", and a phase-space vector 98 corresponding to I2Q2="00". The vector sum of phase-space vectors 86, 96, and 98 is phase-space vector 92. The vector sum of phase-space vectors 96 and 98 equals phase-space vector 88. FIG. 19A depicts only one each of phase-space vectors 86, 88, 96, 98, and 92. But in the 64-QAM constellation of FIG. 19A, in any given unit interval 42: a) phase-space vector 86 is selected from a set of $2^y$ different phase-space vectors by y bits from n-bit codeword 50, b) phase-space vector 96 is selected from a set of $2^{z1}$ different phase-space vectors by z1 bits from n-bit codeword 50, c) phase-space vector 98 is selected from a set of $2^{z2}$ different phase-space vectors by z2 bits from n-bit codeword 50, and d) phase-space vector 88 comes from a set of $2^z$ different phase-space vectors as defined by z bits from n-bit codeword 50.

If the I0Q0="11", I1Q1="11", I2Q2="00" symbol 94 is transmitted in a given unit interval 42 as transmit phase point 54, and the receive phase point 64 is slightly to the right of the noise-free symbol location, the I2Q2 and I1Q1 symbols are respectively cancelled as shown by cancellation vectors 100 and 102, respectively. The first upward movement cancels the I2Q2 symbol. The downward left movement cancels the I1Q1 symbol. This places the resulting offset phase point 68 at the same location receive phase point 64 would have been had only the I0Q0 QPSK signal been transmitted. Also shown are the error residual designations and their distances.

To better visualize the 64-QAM constellation, the previous example 16-QAM constellation is redrawn in FIG. 19B using open circles for the symbol points. The origin of one of these 16-QAM constellations is then placed at each symbol location of the I0Q0 QPSK constellation. The result is the constellation illustrated in FIG. 19C.

FIG. 20 illustrates how the three QPSK signals from the example of FIGS. 19A-19C may be encoded. A first Viterbi generator 48a is used to encode the I0Q0 symbols, a second encoder 48b for the I1Q1 symbols, and a third encoder 48c for the I2Q2 symbols. During unit interval t1, the 2-bit codeword from the encoder 48a selects the I0Q0 QPSK symbol in phase map section 52. Also during unit interval t1, the second encoder 48b selects the I1Q1 QPSK symbol in phase map section 52, and the third encoder 48c selects the I2Q2 symbol in phase map section 52. These three symbols are phase-rotated and added within phase map section 52 to produce the first 64-QAM symbol 94 which is transmitted from transmitter 32.

At receiver 34, there are eight possible paths through the code tree for the first symbol 94 as indicated by the I0Q0 states at unit interval t2. The most probable path is the one with the smallest path metric which is equal to the single path residual for the first received symbol. For subsequent received symbols, the code tree is extended in the same fashion as was illustrated in FIGS. 14-15.

In one embodiment of the present invention, decoder 72 implements a sequential decoding algorithm. The above-discussed pseudo-orthogonal coding techniques, when combined with the sequential decoding algorithm, allows very efficient high-order constellations to be formed. In fact, such high-order constellations could not be formed using current decoding techniques.

FIGS. 21A and 21B show a second 64-QAM embodiment of a phase point constellation built from three pseudo-orthogonal QPSK signals in a manner consistent with the teaching of the present invention. Referring to FIGS. 8A-8B and 21A-21B, a 64-QAM constellation can be formed by rotating an additional, $3^{rd}$ QPSK constellation −45 degrees and placing it's origin at each of the 16-QAM points 84 shown in the FIG. 8B constellation. FIG. 21A depicts the constituent pseudo-orthogonal QPSK signals. FIG. 21B shows the resulting 64-QAM constellation.

Referring to FIG. 21B, more than one I1Q1, I2Q2, I3Q3 symbol 94 maps into identical transmit phase points 54.

Therefore, only 36 constellation points are required to define 64 different symbols. Such a constellation is permitted because the FEC encoders 48 never allow the same constellation point to be reached at the same time. That is, the identical constellation points can only be reached at different times via very different series of QPSK input symbols.

As discussed above, in decoder 72, which is preferably a sequential decoder, the symbols 94 are decoded, not exclusively by the current receive phase point 64, but more by the path through the trellis by which they arrive at the current receive point 64. Since incorrect hypotheses about which I2Q2 and I3Q3 symbols were transmitted lead to very large residuals in the operation of branch metrics generator 66, erroneous paths that lead to one of the identical constellation points tend to be very large with respect the correct path.

In summary, a preferred embodiment of the present invention combines lower order constellations into higher order constellations in a manner that allows the lower order constellations to appear pseudo-orthogonal in the decoding process. By selecting the correct path through the decoder code tree, the additional low order constellation signals have no effect on the primary low order constellation signal. That is, the low order constellation signals appear to be pseudo-orthogonal to each other.

The preferred embodiments of the present invention have been illustrated and described in detail. However, it will be readily apparent to those skilled in the art that various modifications may be made therein without departing from the spirit of the invention.

For example, as the $E_b/N_0$ decreases, more and more paths are retained within decoder 72 because noise increases the correct path residuals, and thus requires a higher threshold to prevent elimination of the correct path. Adding a short parity check code is an efficient method of reducing decoder resources. That is, the inner code allows the decoder to determine which of the retained paths, based on residual value, can be possible paths. Any retained path that fails the parity check cannot be the correct path and can be eliminated.

Such a parity check code is not used for error correction per say, but rather it is used to enhance the determination of retaining the correct path. If the correct path can be retained, then the BER for the high order constellation is equal to the BER of the elementary QPSK constellation from which the high order constellation was formed. That is, cancellation removes the effects of the summed additional QPSK constellations and leaves the base QPSK constellation.

Although the preferred embodiments discussed herein are concerned with rate encoding, where two bits of codeword are generated for each bit of data message, this is not a requirement. Nothing requires that every pseudo-orthogonal signal receive FEC encoding. Thus, for example a rate 3/4 version of a 16-QAM embodiment could be provided by omitting one of encoders 48 altogether and passing an additional bit of message data onto codeword 50 per unit interval 42.

Although the preferred embodiment favors combining QPSK signals into QAM constellations and using convolutional coding, this method is not limited to either. Other constellations and types of coding can be devised. Also, it is well known that convolutional codes, such as taught herein, can be punctured to increase the code rate, and inner block codes can be concatenated with a convolutional outer code to increase coding performance. These and other modifications known to those skilled in the art are to be included within the scope of the present invention.

What is claimed is:

1. A method for decoding a single received transmit phase point selected from a constellation of phase points and transmitted during a unit interval, said method comprising:
   forming a plurality of hypotheses about which single phase point was transmitted during said unit interval;
   calculating a plurality of residuals responsive to the Euclidean distances between each of said plurality of hypothesized transmitted phase points and said single received transmit phase point; and
   applying a decoder process that retains or eliminates decoder code tree paths based on said calculated plurality of residuals, wherein residual average thresholds corresponding to an average of n said residuals are defined for said decoder process, for each said decoder code tree path, the path average of the last n said residuals for that path are calculated, the minimum average residual among all said path averages is identified, and said decoder code tree paths are eliminated if their path averages are greater than the sum of said minimum average residual and said residual average thresholds.

2. The method as claimed in claim 1 wherein:
   a symbol error rate (SER) is defined for said decoder process;
   a cumulative distribution function (CDF) is defined for said plurality of residuals; and
   a plurality of residual probabilities of respectively obtaining each of said plurality of residuals is calculated using said CDF.

3. The method as claimed in claim 2 wherein said decoder code tree paths for which the plurality of residual probabilities are less than said SER are eliminated.

4. The method as claimed in claim 2 wherein:
   a logarithmic SER, which is logarithmically related to said SER, is calculated;
   a plurality of logarithmic residual probabilities, which are respectively logarithmically related to said plurality of residual probabilities, is calculated;
   for each of said decoder code tree paths, a current path logarithmic sum is calculated in response to a past path logarithmic sum and one of said logarithmic residual probabilities; and ones of said decoder code tree paths for which the current path logarithmic sum is less than the logarithmic SER are eliminated.

5. The method as claimed in claim 2 wherein said CDF is a Rayleigh CDF.

6. The method as claimed in claim 1 additionally comprising repeating said forming, calculating, and applying steps for subsequent received transmit phase points transmitted during subsequent unit intervals.

7. A sequential decoder for decoding a received transmit phase point selected from a constellation of phase points and transmitted during a unit interval, said sequential decoder comprising:
   a receiver for converting received symbols into their in-phase (I) and quadrature-phase (Q) components;
   one or more path processors operating in parallel wherein each of said one or more path processors comprises:
      a stored path memory for retained decoder code tree paths;
      a hypothesized transmit symbol lookup table;
      a lookup table for converting the hypothesized transmit symbol into x,y values;
      an adder for subtracting said x,y values from the received symbols converted into the (I) and (Q) components
      a residual memory for converting residual xr,yr values to their Euclidean distance; and
      a residual processor for updating said retained decoder code tree paths in said stored path memory.

8. The sequential decoder as claimed in claim 7 wherein:
   a symbol error rate (SER) is defined for said sequential decoder;
   a cumulative distribution function (CDF) is defined for the residual xr, yr values; and
   a residual probability of obtaining each said residual is calculated using said CDF.

9. The sequential decoder as claimed in claim 8 wherein:
   said residual processor eliminates said decoder code tree paths from said stored path memory if an accumulated residual CDF value is less than said SER.

10. The sequential decoder as claimed in claim 8 wherein:
    a logarithmic SER, equal to the logarithm of said SER, is calculated;
    a logarithmic residual probability, equal to the logarithm of said residual probability, is calculated;
    a path logarithmic sum, equal to a sum of said logarithmic residual probability, for each of said decoder code tree paths is calculated; and
    said residual processor eliminates said decoder code tree path from said stored path memory if said path logarithmic sum is less than said logarithmic SER.

11. The sequential decoder as claimed in claim 10 wherein:
    path subgroups, each equal to some subset of all active paths, is defined;
    a symbol group, related to decoding latency, is defined; and
    said residual processor processes one of the path subgroups for a said symbol group number of symbols before processing the next said path subgroups for a said symbol group number of symbols.

12. The sequential decoder as claimed in claim 7 wherein:
    overlapping decoder groups composed of said one or more path processors operating in parallel are launched from a reset state every frame size number of symbols and operate for a decoding latency number of symbols;
    the number of said overlapping decoder groups implemented is equal to said decoding latency number divided by said frame size plus one;
    at the end of said decoding latency number of symbols, the oldest symbol of the first said decoder group is decoded for the next said frame size number of symbols;
    the subsequent frame size number of symbols are decoded using the second said decoder group; and
    so on for all overlapping said decoder groups in which the first said decoder group is again reset to said frame size number of symbols after the last said decoder group is reset.

13. The sequential decoder as claimed in claim 7 wherein said x,y values in said lookup table for converting said hypothesized transmit symbols into their x,y values are calibrated to compensate for circuit imperfections of said receiver so that said received transmit phase points match said transmit phase points.

14. The sequential decoder as claimed in claim 13 wherein said x,y values are calibrated by using a known training message.

15. The sequential decoder as claimed in claim 13 wherein said x,y values are calibrated continuously by monitoring the noise distribution mean on the correct decoder code tree path.

16. A method for decoding a single received transmit phase point selected from a constellation of phase points and transmitted during a unit interval, said method comprising:
    forming a plurality of hypotheses about which single phase point was transmitted during said unit interval;
    calculating a plurality of residuals responsive to the Euclidean distances between each of said plurality of hypothesized transmitted phase points and said single received transmit phase point; and
    applying a decoder process that retains or eliminates decoder code tree paths based on said calculated plurality of residuals, wherein a symbol error rate (SER) is defined for said decoder process, and a logarithmic SER, which is logarithmically related to said SER, is calculated, wherein a cumulative distribution function (CDF) is defined for said residuals, wherein a plurality of residual probabilities of respectively obtaining each of said plurality of residuals is calculated using said CDF, and a plurality of logarithmic residual probabilities, which are respectively logarithmically related to said plurality of residual probabilities, is calculated, wherein for each of said decoder code tree paths, a current path logarithmic sum is calculated in response to a past path logarithmic sum and one of said plurality of logarithmic residual probabilities, and wherein ones of said decoder code tree paths for which said current path logarithmic sums are less than said logarithmic SER are eliminated.

17. The method as claimed in claim 16 wherein;
    a residual threshold is defined for said decoder process;
    the minimum residual among all current said residuals is identified; and
    said decoder code tree path is eliminated if its current said residual is greater than the sum of said minimum residual and said residual threshold.

18. The method as claimed in claim 16 additionally comprising repeating said forming, calculating, and applying steps for subsequent received transmit phase points transmitted during subsequent unit intervals.

19. The method as claimed in claim 16 wherein said CDF is a Rayleigh CDF.

* * * * *